United States Patent
Ogawa et al.

(10) Patent No.: US 11,447,394 B2
(45) Date of Patent: Sep. 20, 2022

(54) MELILITE COMPOSITE OXIDE

(71) Applicant: KANAGAWA UNIVERSITY, Yokohama (JP)

(72) Inventors: Satoshi Ogawa, Yokohama (JP); Teruki Motohashi, Yokohama (JP); Saito Miwa, Yokohama (JP); Kenta Suzuki, Yokohama (JP)

(73) Assignee: KANAGAWA UNIVERSITY, Kanagawa (JP)

( * ) Notice: Subject to any disclaimer, the term of this patent is extended or adjusted under 35 U.S.C. 154(b) by 260 days.

(21) Appl. No.: 16/651,583

(22) PCT Filed: Sep. 13, 2018

(86) PCT No.: PCT/JP2018/034073
§ 371 (c)(1),
(2) Date: Mar. 27, 2020

(87) PCT Pub. No.: WO2019/065285
PCT Pub. Date: Apr. 4, 2019

(65) Prior Publication Data
US 2020/0255296 A1 Aug. 13, 2020

(30) Foreign Application Priority Data

Sep. 29, 2017 (JP) .............................. JP2017-190808

(51) Int. Cl.
*H01M 4/02* (2006.01)
*C01B 33/24* (2006.01)
*C01G 51/00* (2006.01)

(52) U.S. Cl.
CPC .............. *C01B 33/24* (2013.01); *C01G 51/66* (2013.01); *C01G 51/68* (2013.01); *C01P 2002/30* (2013.01)

(58) Field of Classification Search
CPC ...................................................... H01M 4/02
See application file for complete search history.

(56) References Cited

U.S. PATENT DOCUMENTS

| | | |
|---|---|---|
| 2013/0183593 A1 | 7/2013 | Park et al. |
| 2015/0001436 A1 | 1/2015 | Park et al. |

FOREIGN PATENT DOCUMENTS

| | | |
|---|---|---|
| EP | 3309797 A1 | 4/2018 |
| JP | 2001064638 A | 3/2001 |
| WO | 2017061248 A1 | 4/2017 |

OTHER PUBLICATIONS

Shannon et al. ("Dielectric constants of barium oxide and melilites and the oxide additivity rule" European Journal of Mineralogy (1992), 4(6), 1241-9 CODEN: EJMIER; ISSN: 0935-1221).*

(Continued)

*Primary Examiner* — Jacob B Marks
(74) *Attorney, Agent, or Firm* — Cantor Colburn LLP

(57) ABSTRACT

Provided is a novel compound which can be used for positive-electrode catalysts of metal-air batteries. The melilite-type complex oxide according to the present invention is represented by a general formula (BazSr1−z)2CoxFe2−2x(SiyGe1−y)1+xO7 (in the formula, 0≤x≤1, 0≤y≤1, and 0≤z≤1, excluding the case where x=1, y=1, and z=0, the case where x=1, y=1, and z=1, the case where x=1, y=0, and z=0, the case where x=1, y=0, and z=1, the case where x=0, y=0, and z=0, and the case where x=0, y=0, and z=1).

5 Claims, 11 Drawing Sheets

(56) References Cited

OTHER PUBLICATIONS

Barb et al., "Magnetic hyperfine fields in ferrigehlenites". Hyperfine Interactions, vol. 50, p. 645-650, Jun. 30, 1989.
Endo et al., "Magnetic and Neutron Diffraction Study on Melilite-Type Oxides Sr2MGe2O7 (M=Mn, Co)", Inorganic Chemistry, vol. 51. No 6, p. 3572-3578, Mar. 19, 2012.
Cheng, et al "Metal-air batteries: from oxygen reduction electrochemistry to cathode catalysts", Chemical Society Reviews, vol. 41, Jan. 17, 2012; pp. 2172-2129 (2012).
Li et al., "Recent advances in zinc-air batteries", Chemical Society Reviews, vol. 43, No. 15, Aug. 7, 2014, pp. 5257-5275 (2014).
Suntivich et al., "A Perovskite Oxide Optimized for Oxygen Evolution Catalysis from Molecular Orbital Principles", Science Magazine, vol. 334, Dec. 9, 2011; pp. 1383-1385 (2011).
Suntivich et al., National Chemistry, "Design principles for oxygen-reduction activity on perovskite oxide catalysts for fuel cells and metal-air batteries", vol. 3, Jun. 12, 2011, pp. 546-550 (2011).
International Search Report for International Application PCT/JP2018/034073; dated Oct. 30, 2018.

\* cited by examiner

FIG. 2
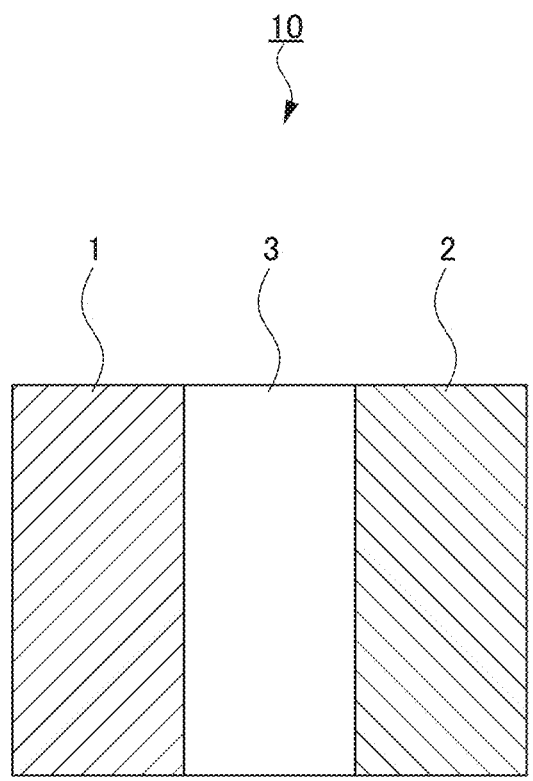
FIG. 3A to FIG. 3D
| FIG. 3A | FIG. 3B | FIG. 3C | FIG. 3D |
|---|---|---|---|
| IMMEDIATELY AFTER IMMERSION | 25°C, 24 h | 40°C, 24 h | 60°C, 24 h |
| 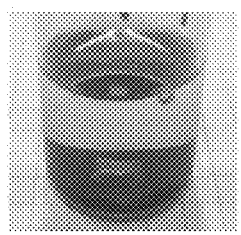 | 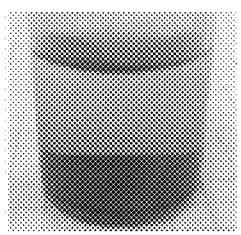 | 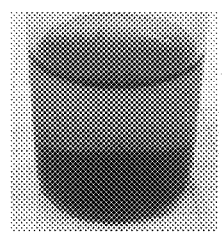 | 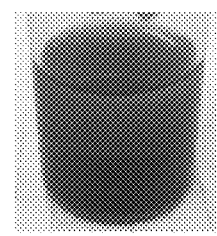 |

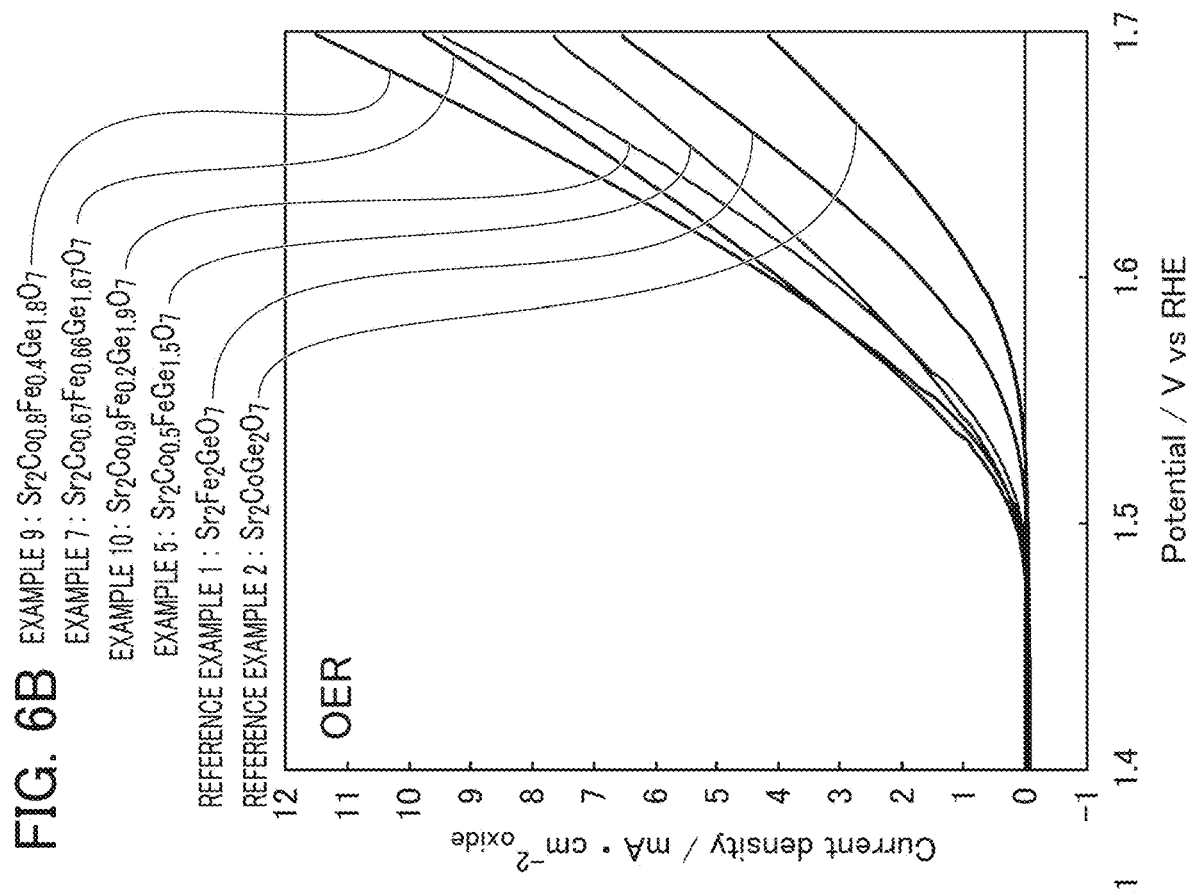

MELILITE COMPOSITE OXIDE

CROSS REFERENCE TO RELATED APPLICATIONS

This is the U.S. national stage of application No. PCT/JP2018/034073, filed on Sep. 13, 2018. Priority under 35 U.S.C. § 119(a) and 35 U.S.C. § 365(b) is claimed from Japanese Application No. 2017-190808, filed Sep. 29, 2017, the disclosure of which is also incorporated herein by reference.

TECHNICAL FIELD

The present invention relates to melilite-type complex oxide.

BACKGROUND ART

In order to further distribute electric vehicles (EV), the development of high-energy-density secondary batteries that attain a standard cruising distance of petrol vehicles is indispensable. Currently, metal-air batteries have attracted attention as "innovative storage batteries" exceeding the current lithium-ion secondary battery. The metal-air batteries are secondary batteries using a metal such as zinc, as a negative-electrode active material, and oxygen in the air, as a positive-electrode active material. For such metal-air batteries, there is a possibility that an extremely high theoretical energy density is attained. The research and development of the metal-air batteries, in particular, zinc-air batteries using zinc as a metal has been conducted for a long time by domestic and international research institutions (for example, Non-Patent Documents 1 and 2), but currently, the metal-air batteries have not been fully commercialized.

However, in the air electrode of the metal-air batteries, hydroxide ions are generated by a four-electron reduction reaction of oxygen (an active material) in the discharging process, and oxygen molecules are generated by a four-electron oxidation reaction of hydroxide ions in the charging process. The oxygen reduction reaction (hereinafter, also referred to as "ORR") and the oxygen evolution reaction (hereinafter, also referred to as "OER"), involving the four-electron transfer, are kinetically sluggish, causing large overpotential both in the charging and discharging processes, and therefore, high-activity electrocatalysts that are capable of accelerating the ORR/OER are required.

Specifically, the charging and discharging reactions in the positive/negative electrodes of the metal-air batteries are as represented by Eqs. (1) to (4). Note that, in Eqs. (1) to (4), for convenience, an example is described in which zinc is used as a negative-electrode.
(Positive-Electrode)

Charging Reaction (Oxygen Evolution Reaction):
$$4OH^- \rightarrow O_2 + 2H_2O + 4e^- \quad (1)$$

Discharging Reaction (Oxygen Reduction Reaction):
$$O_2 + 2H_2O + 4e^- \rightarrow 4OH^- \quad (2)$$

(Negative-Electrode)

Charging Reaction: 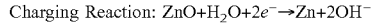 (3)

Discharging Reaction: 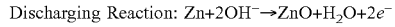 (4)

Here, in the metal-air batteries, a highly alkaline aqueous solution of a high-concentration KOH aqueous solution is used as an electrolyte, and supplies hydroxide ions involved in the formulas (1) and (4). Then, positive-electrode catalysts are immersed in highly alkaline media, and thus, are required to have excellent chemical stability.

It is known that noble metal-based catalysts such as platinum, ruthenium oxide, and iridium oxide exhibit high ORR/OER activity, as the positive-electrode catalyst. However, the noble metals contained in the positive-electrode catalyst are rare and expensive, and thus, it is difficult to commercialize secondary batteries for vehicles or the like on a massive scale. Therefore, positive-electrode catalysts that contain elements abundant in resources, such as transition metals, as a main component, and exhibits versatile high-performance ORR/OER activity have been strongly desired to be developed.

On the other hand, recently, perovskite-type transition metal oxides ($ABO_3$) have been developed as positive-electrode catalysts. It has been reported that when the number of $e_g$ electrons at the octahedrally-coordinated B-site ($BO_6$) in the perovskite structure is close to unity, the ORR/OER activity is maximized (for example, Non-Patent Documents 3 and 4). However, in such a design guide, compounds having other metal-oxygen coordination structures, in particular, other than the perovskite-type oxides having $BO_6$ octahedrally-coordinated sites, are not considered at all. In particular, promising materials that are capable of standing the practical use in the environment in which the metal-air battery is operated have not been found.

Non-Patent Document 1:
F. Cheng, J. Chen, Chem. Soc. Rev., 41, 2172-2192(2012).
Non-Patent Document 2: Y. Li, H. Dai, Chem. Soc. Rev. 43, 5257-5275(2014).
Non-Patent Document 3:
J. Suntivich, H. A. Gasteiger, N. Yabuuchi, H. Nakanishi, J. B. Goodenough, Y. S.-Horn, Nat. Chem., 3, 546-550 (2011).
Non-Patent Document 4:
J. Suntivich, K. J. May, H. A. Gasteiger, J. B. Goodenough, Y. S.-Horn, Science, 334, 1383-1385(2011).

DISCLOSURE OF THE INVENTION

Problems to be Solved by the Invention

The present invention has been made in consideration of the circumstances as described above, and an object thereof is to provide a novel compound that can be used in positive-electrode catalyst for a metal-air battery.

Means for Solving the Problems

The present inventors have conducted intensive studies for attaining the object described above. As a result thereof, it has been found that a melilite-type complex oxide represented by a general formula $(Ba_{1-z})_2Sr_{2z}Co_xFe_{2-2x}(Si_yGe_{1-y})_{1+x}O_7$ (in the formula, $0 \leq x \leq 1$, $0 \leq y \leq 1$, and $0 \leq z \leq 1$, excluding the case of x=1 and y=1, the case of x=1 and y=0, and the case of x=0 and y=0) can be used in a positive-electrode catalyst of a metal-air battery, and thus, the present invention has been completed. Specifically, the present invention provides the following.

(1) The first invention of the present invention is melilite-type complex oxide represented by a general formula $(Ba_zSr_{1-z})_2CO_xFe_{2-2x}(Si_yGe_{1-y})_{1+x}O_7$ (in the formula, $0 \leq x \leq 1$, $0 \leq y \leq 1$, and $0 \leq z \leq 1$, excluding the case of x=1, y=1, and z=0, the case of x=1, y=1, and z=1, the case of x=1, y=0, and z=0, the case of x=1, y=0, and z=1, the case of x=0, y=0, and z=0, and the case of x=0, y=0, and z=1.

(2) The second invention of the present invention is the melilite-type complex oxide according to the first invention, in which $0.5 \leq x \leq 0.9$ is satisfied in the general formula.

(3) The third invention of the present invention is the melilite-type complex oxide according to the first invention or the second invention, in which $0 \leq y \leq 0.1$ is satisfied in the general formula.

(4) The fourth invention of the present invention is a melilite-type complex oxide represented by a general formula $(Ba_{z1}Sr_{1-z1-z2}RE_{z2})_2Co_{x1}Zn_{x2}Fe_{2-2(x1+x2)}(Si_y Ge_{1-y})_{1+x1+x2}O_7$ (in the formula, $0 \leq x1 \leq 1$, $0 \leq x2 \leq 0.2$, $0 \leq y \leq 1$, $0 \leq z1 \leq 1$, $0 \leq z2 \leq 0.2$, and at least one of x2 and z2 is greater than 0).

(5) The fifth invention of the present invention is a melilite-type complex oxide, in which RE is Y in the general formula.

Effects of the Invention

According to the present invention, it is possible to provide a novel compound which can be used for a positive-electrode catalyst of a metal-air battery.

BRIEF DESCRIPTION OF THE DRAWINGS

FIG. 2 shows a sectional view of an air-metal battery according to one embodiment.

FIG. 3A to FIG. 3D show pictures of KOH aqueous solutions before and after a sample of Example 5. FIG. 3A is a picture before the immersion, FIG. 3B is a picture after the immersion at room temperature, FIG. 3C is a picture after the immersion at 40° C., and FIG. 3D is a picture after the immersion at 60° C.

FIG. 6A shows current density-potential curves for ORR of samples of Examples 5, 7, 9, and 10, and Reference Examples 1 and 2, and FIG. 6B shows current density-potential curves in an OER reaction of the samples of Examples 5, 7, 9, and 10 and Reference Examples 1 and 2.

PREFERRED MODE FOR CARRYING OUT THE INVENTION

Hereinafter, a specific embodiment of the present invention (hereinafter, referred to as "this embodiment") will be described in detail. Note that, the present invention is not limited to the following embodiment, and can be implemented by adding a suitable change within a desired scope of the present invention.

<1. Melilite-Type Complex Oxide>

Melilite-type oxide according to this embodiment is represented by a general formula $(Ba_zSr_{1-z})_2Co_xFe_{2-2x}(Si_y Ge_{1-y})_{1+x}O_7$ (in the formula, $0 \leq x \leq 1$, $0 \leq y \leq 1$, and $0 \leq z \leq 1$, excluding the case of x=1 and y=1, the case of x=1 and y=0, and the case of x=0 and y=0). Here, a sum of the number of atoms of $Co^{2+}$, $Fe^{3+}$, $Si^{4+}$, and $Ge^{4+}$ is 3/2 with respect to a sum of the number of atoms of Ba and Sr. In addition, a sum of electric charges of $Co^{2+}$, $Fe^{3+}$, $Si^{4+}$, and $Ge^{4+}$ is designed to be +10. Accordingly, it is possible to form a melilite-type complex oxide phase.

In general, the "melilite-type compound" indicates a compound group represented by a general formula $A_2MM'_2O_7$. Here, A is cations of groups I to III or lanthanoid ions, M and M' are divalent or more transition metal or non-transition metal, and both M and M' are located at four-coordination sites. Here, the present inventors have found that it is possible to design a compound having a melilite-type structure of various chemical compositions even in the case of chemical composition not represented by the general formula $A_2MM'_2O_7$, insofar as the requirement of the sum of the number of atoms and the sum of the electric charges, as described above, is satisfied.

Figure 1:
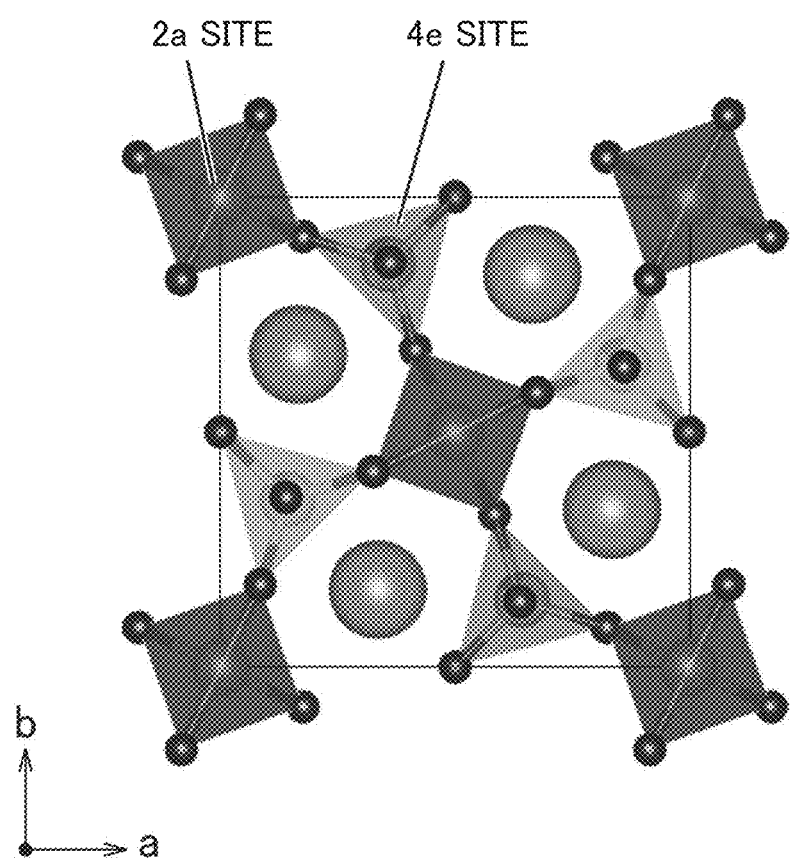
FIG. 1 shows a schematic view of an arrangement of configuration elements on an ab plane of a melilite-type complex oxide.

As it is obvious from the general formula described above, in the melilite-type compound, the divalent or more transition metal or non-transition metal is located at two types of four-coordination sites. Such sites will be respectively referred to as a "2a site" and a "4e site". FIG. 1 is a schematic view of an arrangement of configuration elements on an ab plane of the melilite-type complex oxide. That is, the drawing corresponds to when the ab plane of the melilite-type oxide is seen from a c-axis direction.

As described above, all transition metals in the melilite-type structure are allocated at four-coordination sites. In contrast, in the perovskite-type structure disclosed in Non-Patent Documents 3 and 4, all transition metals are located at the six-coordination sites. That is, in the melilite-type oxide, the number of oxide ions coordinated with transition metal ions is small compared to perovskite-type complex oxide that is used as the existing positive-electrode catalyst for metal-air battery material. As described above, it is considered that the oxide ions are sparsely coordinated with the transition metal ions, and thus, the melilite-type oxide has the high adsorptive capacity that is the catalytic reaction center, compared to the perovskite-type oxide.

In addition, such complex oxide contains extremely stable Si ions or Ge ions in which the number of oxidations is +4. Accordingly, it is possible to enhance the chemical stability of the complex oxide, and for example, in the case of alkali immersion, it is possible to suppress the dissolution in an alkaline solution.

As with the general formula described above, Co:Fe:Si+Ge is x:2−2x:1+x, in the atomic ratio. Here, the value of x may be an integer, or may be a decimal, insofar as the value of x is in a range of $0 \leq x \leq 1$.

The value of x is not particularly limited, but is preferably in a range of $0<x<1$, is more preferably in a range of $0.2 \leq x \leq 0.97$, is even more preferably in a range of $0.4 \leq x \leq 0.95$, and is particularly preferably in a range of $0.5 \leq x \leq 0.9$, from the viewpoint of OER activity. The value of x being in the range of $0<x<1$ indicates that $Co^{2+}$ and $Fe^{3+}$ coexist in the complex oxide. Accordingly, it is possible to increase the OER activity of the positive-electrode catalyst, compared to a complex oxide containing only $Co^{2+}$ (x=1) and a complex oxide containing only $Fe^{3+}$ (x=0).

On the other hand, the value of x is preferably $0.6 \leq x \leq 1$, is more preferably $0.7 \leq x \leq 1$, is even more preferably $0.8 \leq x \leq 1$, and is particularly preferably $0.9 \leq x \leq 1$, from the viewpoint of ORR activity. It is indicated that the amount of Co increases as the value of x increases, and thus, it is possible to increase the ORR activity of the positive-electrode catalyst.

As with the general formula described above, Si:Ge is y:1−y, in the atomic ratio. Here, the value of y may be an integer, or may be a decimal, insofar as the value of y is in a range of $0 \leq y \leq 1$.

The value of y is not particularly limited, but is preferably in a range of $0 \leq y \leq 0.7$, is more preferably in a range of $0 \leq y \leq 0.5$, is even more preferably in a range of $0 \leq y \leq 0.2$, and is particularly preferably in a range of $0 \leq y \leq 0.1$. It is indicated that Ge is substituted with Si that is more resource-abundant as the value of y increases, which is industrially advantageous, but there is a concern that the ORR activity and the OER activity of the positive-electrode catalyst are slightly decreased.

In addition, the value of y is preferably in a range of $0<y<1$, is more preferably in a range of $0.1 \leq y \leq 0.9$, and is even more preferably in a range of $0.2 \leq y \leq 0.8$. The value of y being in the range of $0<y<1$ indicates that Ge and Si coexist in the complex oxide. As described above, it is industrially advantageous that it is possible to decrease the cost of the positive-electrode catalyst by substituting Ge with Si that is much more resource-abundant, or the like.

As with the general formula described above, Ba:Sr is z:1−z, in the atomic ratio. Here, the value of z may be an integer, or may be a decimal, insofar as the value of z is in a range of $0 \leq z \leq 1$.

The value of z is not particularly limited, but is preferably in a range of $0 \leq z \leq 0.5$, is more preferably in a range of $0 \leq z \leq 0.2$, and is even more preferably in a range of $0 \leq z \leq 0.1$. It is indicated that the amount of Sr increases as the value of z decreases, and thus, it is possible to increase the OER activity of the positive-electrode catalyst.

In addition, the value of z is preferably in a range of $0.5 \leq z \leq 1$, is more preferably in a range of $0.7 \leq z \leq 1$, and is even more preferably in a range of $0.9 \leq z \leq 1$. It is indicated that the amount of Ba increases as the value of z increases, and thus, it is possible to increase the ORR activity of the positive-electrode catalyst.

Note that, a substitution element of less than or equal to 10% can be contained in each of sites in which Ba and Sr are located, a site in which Co and Fe are located, a site in which Si and Ge are located, and an oxygen site, in the atomic ratio. The amount of impurity element contained in each of the sites is preferably less than or equal to 5%, is more preferably less than or equal to 2%, and is even more preferably less than or equal to 1%, at an atomic ratio.

In particular, the melilite-type complex oxide described above is capable of containing a rare earth metal RE at the Ba or Sr are arranged, and Zn at the site in which Co or Fe are arranged, at 20 mol % of the total number of moles of all of the metals contained in each of the sites, as an upper limit. Specifically, such a melilite-type complex oxide is represented by a general formula $(Ba_{z1}Sr_{1-z1-z2}RE_{z2})_2 Co_{x1}Zn_{x2}Fe_{2-2(x1+x2)}(Si_yGe_{1-y})_{1+x1+x2}O_7$ (in the formula, $0 \leq x1 \leq 1$, $0 \leq x2 \leq 0.2$, $0 \leq y \leq 1$, $0 \leq z1 \leq 1$, $0 \leq z2 \leq 0.2$, and at least one of x2 and z2 is greater than 0). Such melilite-type oxide has different properties in accordance with each substitution element, but is excellent in at least one of the alkali resistance, the ORR activity, and the OER activity.

The value of x1 is not particularly limited, and may be greater than 0, and may be less than 1. In addition, it is preferable that the value of x1 is in the same range as that of the value of x described above.

The value of x2 is not particularly limited, and for example, may be greater than or equal to 0.001, may be greater than or equal to 0.005, or may be greater than or equal to 0.01. On the other hand, the value of x2, for example, may be less than or equal to 0.05, may be less than or equal to 0.045, or may be less than or equal to 0.04.

The value of y is not particularly limited, and may be greater than 0, and may be less than 1. In addition, it is preferable that the value of y is in the same range as that of the value of y described above.

The value of z1 is not particularly limited, and may be greater than 0, and may be less than 1. In addition, it is preferable that the value of z1 is in the same range as that of the value of z described above.

The value of z2 is not particularly limited, and for example, may be greater than or equal to 0.001, may be greater than or equal to 0.005, or may be greater than or equal to 0.01. On the other hand, the value of z2, for example, may be less than or equal to 0.05, may be less than or equal to 0.045, or may be less than or equal to 0.04.

Note that, herein, the rare earth element "RE" is a generic term of Sc, Y, and lanthanoid (La, Ce, Pr, Nd, Pm, Sm, Eu, Gd, Tb, Dy, Ho, Er, Tm, Yb, and Lu). It is preferable to use Y, as the rare earth element.

The shape of the melilite-type complex oxide is not particularly limited, and can be suitably selected from a granular shape, a bulky shape, and the like, in accordance with the specification of an air-metal battery to be used. Among them, it is preferable to use a granular metal-air battery.

In the case of using the granular melilite-type complex oxide, a specific surface area thereof is not particularly limited, but for example, is preferably greater than or equal to 0.5 $m^2/g$, is more preferably greater than or equal to 0.7 $m^2/g$, and is even more preferably greater than or equal to 1 $m^2/g$. On the other hand, the catalytic activity increases as the specific surface area increases, but there is also a concern that the dissolution in an alkaline solution easily performed. Therefore, the specific surface area is preferably less than or equal to 10 $m^2/g$, and is preferably less than or equal to 9 $m^2/g$. Note that, herein, the "specific surface area" indicates a value measured with a specific surface area/pore distribution measurement device (TriStar 3000, manufactured by Micromeritics Instrument Corp.) and analyzed based on the BET method. Prior to the measurement, the sample needs to be pretreated with a pretreatment device (VacPrep061, manufactured by Micromeritics Instrument Corp.).

[Manufacturing Method of Melilite-Type Complex Oxide]

A manufacturing method of the melilite-type complex oxide is not particularly limited, and various manufacturing methods of ceramic material can be used. For example, a liquid phase method such as a polymerized complex method or a hydrothermal synthesis method, a solid-state reaction method such as a sintering method, and the like can be used. Among them, with the liquid phase method, it is possible to obtain particles having high chemical homogeneity even in the case of being fired at a low temperature, and as a result thereof, it is possible to obtain a positive-electrode catalyst having a small particle diameter, high specific surface area, high ORR and OER activity.

Specifically, the melilite-type complex oxide, for example, can be synthesized by an amorphous metal complex method. With the use of this method, for example, a firing temperature can be lowered as compared to a solid-state reaction method, and an energy cost for manufacturing is reduced. Hereinafter, the amorphous metal complex method will be described. In this method, first, metal sources are added and dissolved in pure water to be identical to a stoichiometric proportion of metals contained in a target product, citric acid is added and stirred to be homogeneous, and thus, a raw material solution is obtained (a solution preparing step). Next, the raw material solution is heated and condensed, and thus, a citrate gel obtained (a gelation step). After that, an organic component in the citrate gel is decomposed by heat treatment and thus, a powder precursor is obtained (a precursor preparing step). The precursor is pulverized (a pulverizing step) and fired (a firing step), and thus, melilite-type complex oxide is obtained.

(Solution Preparing Step)

The solution preparing step is a step in which the metal sources are added and dissolved in pure water to be identical to the stoichiometric proportion of the metals contained in the target product, and citric acid is added and stirred to be homogeneous, and thus, a raw material solution is obtained.

Sr, Ba, Co, and Fe sources are not particularly limited, and for example, nitrate or acetate of such metals can be used.

A Ge source is not particularly limited, and for example, germanium oxide or a germanium complex can be used. For example, a complex of a chelating agent that has a carboxy group (—COOH) and a hydroxy group (—OH), and has a plurality of such functional groups, such as a citrate complex, a glycolate complex, a lactate complex, a malate complex, a malonate complex, a fumarate complex, and a maleate complex, can be used as the germanium complex. For such chelating agents, ions obtained by the deprotonation of the carboxy group or the hydroxy group in the molecules are easily coordinated with cations, and two or more functional groups are coordinated (chelated) to interpose the cation therebetween, and thus, the complexing ability is high. Note that, other chelating agents in addition to such a chelating agent, can also be used insofar as the other chelating agents are capable of forming a germanium complex and the germanium complex can be dissolved in water.

In general, germanium oxide (IV) is used as a starting material for the synthesis of a germanium-based compound in the solid-state reaction method. On the other hand, the germanium oxide (IV) is not dissolved in water, and thus, is not suitable as a starting material in the liquid phase method using water as a solvent, in particular. While the germanium oxide (IV) can be dissolved in an aqueous solution of strongly basic media, and for example, even in a case where a strongly basic-aqueous solution is prepared by using sodium hydroxide or potassium hydroxide, the resultant solution contains sodium or potassium, and thus, the product may be contaminated by the unintended metal ions. In addition, examples of the starting material for the liquid phase method include germanium chloride (IV), but there is a concern that the germanium chloride (IV) is also dissolved in glycol, but the germanium oxide (IV) is precipitated, and thus, is not capable of being used as a solvent containing water as the main component. In contrast, the usage of the water-soluble germanium complex described above enables us to obtain a homogeneous and stable germanium aqueous solution to perform homogeneous liquid phase synthesis of the germanium compound. Then, as a result thereof, it is possible to provide a low-temperature synthesis process for the melilite-type complex oxide.

For the germanium complexes described above, it is preferable to use the citrate complex, from the viewpoint of a cost, a solubility to water, or the like. Note that, the citrate complex can be prepared by dissolving the germanium oxide in an aqueous solution of citric acid.

A Si source is not particularly limited, and for example, glycol-modified silane such as propylene glycol-modified silane, ethylene-glycol-modified silane, and polyethylene-glycol-modified silane can be used. Note that, such glycol-modified silane can be prepared by mixing tetraalkoxy silane such as tetramethoxy silane, tetraethoxy silane, tetrapropoxy silane, and tetraisopropoxy silane, glycol, and a hydrochloric acid (a catalyst). A more detailed preparation method, for example, is disclosed in JP 2010-7032 A, and thus, the description is omitted here. Note that, it is preferable to use tetramethoxy silane as a tetraalkoxy silane, from the viewpoint of miscibility with other metal sources, or the like.

It is preferable that the amount of citric acid in the raw material solution is 3 times to 5 times (in molar ratio) the total amount of metal ions in the raw material solution. Accordingly, it is possible to efficiently prepare a gel in the gelation step at a later stage.

(Gelation Step)

The gelation step is a step in which the raw material solution is heated and condensed, and thus, citrate gel is formed.

Heating and condensing methods are not particularly limited, and for example, a thermostatic bath or a thermostatic furnace can be used.

A temperature for heating and condensing is not particularly limited, and for example, it is preferable that heating is performed at higher than or equal to 80° C. and lower than or equal to 150° C., and it is more preferable that heating is performed at higher than or equal to 90° C. and lower than or equal to 140° C.

(Precursor Preparing Step)

The precursor preparing step is a step in which an organic component in the citrate gel is decomposed by heat treatment, and thus, a powder precursor is obtained.

A temperature for the heat treatment is not particularly limited insofar as organic substance is decomposed at the temperature, but for example, is preferably higher than or equal to 250° C. and lower than or equal to 600° C., is more preferably higher than or equal to 300° C. and lower than or equal to 550° C., and is even more preferably higher than or equal to 400° C. and lower than or equal to 500° C.

(Pulverizing Step)

The pulverizing step is a step in which the powder precursor obtained in the precursor preparing step is pulverized but is not essential.

A pulverizing method is not particularly limited, and a known pulverizing device of the related art can be used.

A particle diameter after pulverization is not particularly limited, and for example, an average particle diameter can be in a range of greater than or equal to 1 µm and less than or equal to 5 µm. Note that, the "average particle diameter"

is obtained by observing 100 arbitrary particles with an optical microscope or an electron microscope, and by averaging maximum distances between one end and the other end in each of the particles.

(Firing Step)

The firing step is a step in which the precursor is fired.

A firing temperature is not particularly limited, but for example, is preferably higher than or equal to 800° C. and lower than or equal to 1200° C., is more preferably higher than or equal to 850° C. and lower than or equal to 1150° C., and is even more preferably higher than or equal to 900° C. and lower than or equal to 1100° C.

<2. Positive-Electrode Catalyst>

The positive-electrode catalyst according to this embodiment, contains the melilite-type complex oxide described above.

In the positive-electrode catalyst, only one type of melilite-type complex oxide can be independently used, or two or more types of melilite-type complex oxides can be used together. For example, it is possible to obtain the positive-electrode catalyst excellent in both of the ORR activity and the OER activity by combining the melilite-type complex oxide particularly excellent in the ORR activity and the melilite-type complex oxide particularly excellent in the OER activity together.

In addition, the positive-electrode catalyst is capable of containing other materials within a range not impairing the effect of the present invention. Specifically, the positive-electrode catalyst is capable of containing various materials such as a conductive additive, an adhesive agent, and a protonic conductor. For example, graphite (carbon black) or the like can be used as the conductive additive. In addition, Nafion (Registered Trademark) can be used as the adhesive agent and the protonic conductor. Further, a positive-electrode catalyst other than the melilite-type complex oxide can be used. Note that, the positive-electrode catalyst is also capable of containing impurities, within a range not impairing the effect of the present invention.

<3. Metal-Air Battery>

A metal-air battery, according to this embodiment, contains the positive-electrode catalyst described above. Then, such a metal-air battery has high charge and discharge properties and high durability.

Hereinafter, a specific configuration of the metal-air battery will be described by using the drawings. FIG. 2 is a sectional view of an air-metal battery according to one embodiment of the present invention. A metal-air battery 10 includes a positive-electrode 1 containing the positive-electrode catalyst described above, a negative-electrode 2, and an electrolyte 3.

In the metal-air battery 10, the positive-electrode 1 and the negative-electrode 2 are arranged to face each other with the electrolyte 3 therebetween.

Even though it is not illustrated, in one embodiment, the positive-electrode 1 includes a positive-electrode catalyst layer and a gas diffusion layer. Here, the positive-electrode catalyst layer is formed on the electrolyte 3 side of the gas diffusion layer, and the gas diffusion layer is formed on a side opposite to the electrolyte. Note that the gas diffusion layer is not essential.

The positive-electrode catalyst layer contains the positive-electrode catalyst described above. The positive-electrode catalyst layer, for example, can be formed on a substrate or the gas diffusion layer described below, by a method such as a slurry coating method, a spray coating method, and a firing method.

The gas diffusion layer is not particularly limited insofar as the material has both the electrical conductivity and air permeability, and for example, carbon paper, carbon cloth, carbon felt, metal mesh, and the like can be used.

The negative-electrode 2 includes a negative-electrode layer containing a negative-electrode active material that contains elements selected from alkaline metal, alkaline earth metal, first transition metal, zinc, and aluminum. Examples of the alkaline metal include Li, Na, K, and the like. Examples of the alkaline earth metal include Mg, Ca, and the like. Examples of the first transition metal include Fe, Ti, Ni, Co, Cu, Mn, Cr, and the like. Metals, alloys, a compound, and the like containing the elements described above can be used as the negative-electrode active material. Specifically, examples of the compound that can be used as the negative-electrode active material include oxides, nitrides, carbonates, and the like of the elements described above.

The electrolyte 3 contains an alkaline aqueous solution such as a KOH aqueous solution, a NaOH aqueous solution, and a LiOH aqueous solution. An alkaline concentration is not particularly limited, but for example, it is preferable that the concentration of hydroxide ions ([$OH^-$]) is greater than or equal to 1 mol/L to 10 mol/L.

Even though it is not illustrated, in one embodiment, in order to prevent a short circuit due to a contract between the positive-electrode 1 and the negative-electrode 2, a separator can be provided between the positive-electrode and the negative-electrode (for example, with the electrolyte 3 therebetween).

The separator is not particularly limited insofar as the material is an insulating material through which the electrolyte is capable of being moved (of permeating), and for example, a non-woven fabric or a porous film, formed of a resin such as a polyolefin and a fluorine resin, can be used. Examples of the resin include polyethylene, polypropylene, polytetrafluoroethylene, and polyvinylidene fluoride. In a case where the electrolyte is an aqueous solution, such resin can also be used by being pretreated to have hydrophilicity.

In the case of using an aqueous solution containing an electropositive metal such as an alkaline metal, as the electrolyte 3, it is not possible to bring an aqueous electrolyte into direct contact with a metal negative-electrode, and it is necessary to mediate an organic electrolyte with respect to the negative-electrode 2 side. In this case, for example, the aqueous electrolyte is arranged on the positive-electrode 1 side, and the organic electrolyte is arranged on the negative-electrode 2 side, with a solid electrolyte between the positive-electrode 1 and the negative-electrode 2.

The shape of such a metal-air battery (the shape of a case) is not particularly limited, and for example, shapes such as a coin type, a button type, a sheet type, a laminated type, a cylindrical type, a flat type, and a square type can be used.

For metal-air battery using the melilite-type complex oxide as a positive-electrode catalyst, a Tafel slope of the oxygen evolution reaction measured in a 4 M-KOH aqueous solution, for example, is preferably less than or equal to 55 $mV \cdot dec^{-1}$, and is more preferably less than or equal to 50 $mV \cdot dec^{-1}$. The Tafel slope is defined as a voltage that is required to change a current by one digit, and performance as the electrode catalyst becomes higher as the value decreases. Note that, for oxygen evolution reaction the Tafel slope a positive-electrode catalyst with a Co-based perovskite that is used in the related art is approximately 60 $mV \cdot dec^{-1}$, and thus, the metal-air battery using the melilite-type complex oxide as the positive-electrode catalyst has high performance, from the viewpoint of the Tafel slope.

Note that, the Tafel slope can be obtained by analyzing a polarization curve of each of ORR and OER. Specifically, a Tafel plot is drawn by representing common logarithm of measured current-density value on the horizontal axis, and by representing overpotential value obtained by subtracting the theoretical potential for the oxygen reaction from a potential value on the vertical axis, and a linear slope in a region at which the logarithm of the ORR or OER current is set to the Tafel slope.

EXAMPLES

Hereinafter, the present invention will be described in more detail with examples, but the present invention is not limited to the examples.

Preparation of Sample

Examples 1 to 28 and Reference Examples 1 to 5

The samples as the positive-electrode catalysts were prepared by the following method. The following were used as raw materials.
Ba Source: $Ba(CH_3COO)_2$ (Purity of 99.9%, manufactured by Wako Pure Chemical Industries, Ltd.)
Sr Source: $SrNO_3$ (purity 99.5%, manufactured by Wako Pure Chemical Industries, Ltd.)
Co Source: $Co(CH_3COO)_2 \cdot 4H_2O$ (purity 99%, manufactured by Wako Pure Chemical Industries, Ltd.)
Fe Source: $Fe(NO_3)_3 \cdot 9H_2O$ (Purity of 99.9%, manufactured by Wako Pure Chemical Industries, Ltd.)
Si Source: $C_8H_2O_4Si$ (97%, manufactured by Tokyo Chemical Industry Co., Ltd.)
Ge Source: $GeO_2$ (99.99%, manufactured by Kojundo Chemical Laboratory Co., Ltd.)
La Source: $La(NO_3)_3 \cdot 6H_2O$ (99.9%, manufactured by Wako Pure Chemical Industries, Ltd.)
Ca Source: $Ca(NO_3)_2 \cdot 4H_2O$ (99.9%, manufactured by Wako Pure Chemical Industries, Ltd.)
Gelatinizing Agent: Citric Acid $C_6H_8O_7$ (Purity of 98%, manufactured by Wako Pure Chemical Industries, Ltd.)

Each of the metal sources was dissolved in pure water such that a target product was 1 mmol at a charging ratio identical to a stoichiometric proportion of metal ions in the chemical formula of the target product shown in Table 1, and a citric acid at a molar quantity of 3 times a total cation amount was added and was homogeneously stirred, and thus, a raw material solution was obtained. The raw material solution was left to stand in a thermostatic bath that was set to 120° C., and was heated and condensed. An oversaturated citric gel that lost fluidity and was gelled was subjected to a heat treatment at 450° C., and an organic component was decomposed, and thus, a powder precursor was obtained. The precursor obtained as described above was pulverized, and was fired at 1000° C. for 12 hours in the atmosphere by using a box furnace.

(Comparative Example 1) Synthesis of $La_{0.5}Ca_{0.5}CoO_3$

Each of the metal sources was dissolved in pure water such that a target product was 2 mmol at a charging ratio identical to a stoichiometric proportion of metal ions of the target product, and a citric acid was added at a molar quantity of 3 times a total cation amount and was stirred and mixed to be a homogeneous solution. A raw material solution that was mixed was left to stand in a thermostatic bath that was set to 120° C., and was heated and condensed. An oversaturated citric gel that lost fluidity and was gelled was subjected to a heat treatment at 450° C., and an organic component was decomposed, and thus, a powder precursor was obtained. The precursor obtained as described above was pulverized, and was fired at 1000° C. for 12 hours in the atmosphere by using a box furnace.

(Comparative Example 2) Synthesis of $Ba_{0.5}Sr_{0.5}Co_{0.8}Fe_{0.2}O_3$

Each of the metal sources was dissolved in pure water such that a target product was 2 mmol at a charging ratio identical to a stoichiometric proportion of metal ions of the target product, and a citric acid was added at a molar quantity of 3 times a total cation amount and was stirred and mixed to be a homogeneous solution. A raw material solution that was mixed was left to stand in a thermostatic bath that was set to 120° C., and was heated and condensed. An oversaturated citric gel that lost fluidity and was gelled was subjected to a heat treatment at 450° C., and an organic component was decomposed, and thus, a powder precursor was obtained. The precursor obtained as described above was pulverized, and was fired at 1000° C. for 12 hours in the atmosphere by using a box furnace.

Each of the obtained samples was subjected to X-ray diffraction measurement. Table 1 shows a formation phase that is identified by an XRD pattern of each of the samples. In all of Examples 1 to 20 and Reference Examples 1 to 5, only an XRD pattern of the melilite-type complex oxide was checked, and thus, it was found that the melilite-type complex oxide was generated in a single phase. On the other hand, in Examples 21 to 28, a pattern of a subphase was also checked in addition to the XRD pattern of the melilite-type complex oxide, and thus, it was found that a by-product was generated in addition to the melilite-type complex oxide.

TABLE 1

| | Chemical formula (theoretical ratio) | x | y | z | Formation phase |
|---|---|---|---|---|---|
| Reference Example 1 | $Sr_2Fe_2GeO_7$ | 0 | 0 | 0 | Melilite-type complex oxide single phase |
| Example 1 | $Sr_2Co_{0.1}Fe_{1.8}Ge_{1.1}O_7$ | 0.1 | 0 | 0 | Melilite-type complex oxide single phase |
| Example 2 | $Sr_2Co_{0.2}Fe_{1.6}Ge_{1.2}O_7$ | 0.2 | 0 | 0 | Melilite-type complex oxide single phase |
| Example 3 | $Sr_2Co_{0.3}Fe_{1.4}Ge_{1.3}O_7$ | 0.3 | 0 | 0 | Melilite-type complex oxide single phase |
| Example 4 | $Sr_2Co_{0.4}Fe_{1.2}Ge_{1.4}O_7$ | 0.4 | 0 | 0 | Melilite-type complex oxide single phase |
| Example 5 | $Sr_2Co_{0.5}FeGe_{1.5}O_7$ | 0.5 | 0 | 0 | Melilite-type complex oxide single phase |
| Example 6 | $Sr_2Co_{0.6}Fe_{0.8}Ge_{1.6}O_7$ | 0.6 | 0 | 0 | Melilite-type complex oxide single phase |
| Example 7 | $Sr_2Co_{0.67}Fe_{0.67}Ge_{1.66}O_7$ | 0.67 | 0 | 0 | Melilite-type complex oxide single phase |
| Example 8 | $Sr_2Co_{0.7}Fe_{0.6}Ge_{1.7}O_7$ | 0.7 | 0 | 0 | Melilite-type complex oxide single phase |
| Example 9 | $Sr_2Co_{0.8}Fe_{0.4}Ge_{1.8}O_7$ | 0.8 | 0 | 0 | Melilite-type complex oxide single phase |
| Example 10 | $Sr_2Co_{0.9}Fe_{0.2}Ge_{1.9}O_7$ | 0.9 | 0 | 0 | Melilite-type complex oxide single phase |

TABLE 1-continued

|  | Chemical formula (theoretical ratio) | x | y | z | Formation phase |
|---|---|---|---|---|---|
| Reference Example 2 | $Sr_2CoGe_2O_7$ | 1 | 0 | 0 | Melilite-type complex oxide single phase |
| Reference Example 3 | $Ba_2Fe_2GeO_7$ | 0 | 0 | 0.5 | Melilite-type complex oxide single phase |
| Example 11 | $Ba_2Co_{0.1}Fe_{1.8}Ge_{1.1}O_7$ | 0.1 | 0 | 0.5 | Melilite-type complex oxide single phase |
| Example 12 | $Ba_2Co_{0.2}Fe_{1.6}Ge_{1.2}O_7$ | 0.2 | 0 | 0.5 | Melilite-type complex oxide single phase |
| Example 13 | $Ba_2Co_{0.3}Fe_{1.4}Ge_{1.3}O_7$ | 0.3 | 0 | 0.5 | Melilite-type complex oxide single phase |
| Example 14 | $Ba_2Co_{0.4}Fe_{1.2}Ge_{1.4}O_7$ | 0.4 | 0 | 0.5 | Melilite-type complex oxide single phase |
| Example 15 | $Ba_2Co_{0.5}FeGe_{1.5}O_7$ | 0.5 | 0 | 0.5 | Melilite-type complex oxide single phase |
| Example 16 | $Ba_2Co_{0.6}Fe_{0.8}Ge_{1.6}O_7$ | 0.6 | 0 | 0.5 | Melilite-type complex oxide single phase |
| Example 17 | $Ba_2Co_{0.67}Fe_{0.67}Ge_{1.66}O_7$ | 0.67 | 0 | 0.5 | Melilite-type complex oxide single phase |
| Example 18 | $Ba_2Co_{0.7}Fe_{0.6}Ge_{1.7}O_7$ | 0.7 | 0 | 0.5 | Melilite-type complex oxide single phase |
| Example 19 | $Ba_2Co_{0.8}Fe_{0.4}Ge_{1.8}O_7$ | 0.8 | 0 | 0.5 | Melilite-type complex oxide single phase |
| Example 20 | $Ba_2Co_{0.9}Fe_{0.2}Ge_{1.9}O_7$ | 0.9 | 0 | 0.5 | Melilite-type complex oxide single phase |
| Reference Example 4 | $Ba_2CoGe_2O_7$ | 1 | 0 | 0.5 | Melilite-type complex oxide single phase |
| Example 21 | $Sr_2Fe_2Si_{0.5}Ge_{0.5}O_7$ | 0 | 0.5 | 0 | Melilite-type complex oxide + subphase |
| Example 22 | $Sr_2Fe_2SiO_7$ | 0 | 1 | 0 | Melilite-type complex oxide + subphase |
| Example 23 | $Sr_2Co_{0.67}Fe_{0.67}Si_{0.83}Ge_{0.83}O_7$ | 0.67 | 0.5 | 0 | Melilite-type complex oxide + subphase |
| Example 24 | $Sr_2Co_{0.67}Fe_{0.67}Si_{1.66}O_7$ | 0.67 | 1 | 0 | Melilite-type complex oxide + subphase |
| Example 25 | $Sr_2CoSiGeO_7$ | 1 | 0.5 | 0 | Melilite-type complex oxide + subphase |
| Reference Example 5 | $Sr_2CoSi_2O_7$ | 1 | 1 | 0 | Melilite-type complex oxide |
| Example 26 | $Ba_2Fe_2Si_{0.5}Ge_{0.5}O_7$ | 0 | 0.5 | 0.5 | Melilite-type complex oxide + subphase |
| Example 27 | $Ba_2Co_{0.67}Fe_{0.67}Si_{0.83}Ge_{0.83}O_7$ | 0.67 | 0.5 | 0.5 | Melilite-type complex oxide + subphase |
| Example 28 | $Ba_2CoSiGeO_7$ | 1 | 0.5 | 0.5 | Melilite-type complex oxide + subphase |

Table 2 shows lattice constants in an a-axis direction and a c-axis direction that are obtained by XRD patterns of melilite-type complex oxide samples obtained in Examples 1 to 10 and Reference Examples 1 and 2. The lattice constant in the a-axis direction continuously increased, and the lattice constant in the c-axis direction continuously decreased, as the amount of Co increased. Accordingly, it was found that a solid solution in which Fe and Co coexisted was continuously formed between $Sr_2Fe_2GeO_7$ (Reference Example 1) and $Sr_2CoGe_2O_7$ (Reference Example 2).

TABLE 2 Melilite-type complex oxide + subphase

|  | Chemical formula (theoretical ratio) | Amount x of Co | Amount 2 − 2x of Fe | Lattice constants in a-axis direction [Å] | Lattice constants in c-axis direction [Å] |
|---|---|---|---|---|---|
| Reference Example 1 | $Sr_2Fe_2GeO_7$ | 0 | 2.0 | 8.136(1) | 5.372(0) |
| Example 1 | $Sr_2Co_{0.1}Fe_{1.8}Ge_{1.1}O_7$ | 0.1 | 1.8 | 8.139(1) | 5.37(0) |
| Example 2 | $Sr_2Co_{0.2}Fe_{1.6}Ge_{1.2}O_7$ | 0.2 | 1.6 | 8.142(0) | 5.365(0) |
| Example 3 | $Sr_2Co_{0.3}Fe_{1.4}Ge_{1.3}O_7$ | 0.3 | 1.4 | 8.144(1) | 5.362(1) |
| Example 4 | $Sr_2Co_{0.4}Fe_{1.2}Ge_{1.4}O_7$ | 0.4 | 1.2 | 8.144(1) | 5.355(1) |
| Example 5 | $Sr_2Co_{0.5}FeGe_{1.5}O_7$ | 0.5 | 1.0 | 8.147(1) | 5.351(0) |
| Example 6 | $Sr_2Co_{0.6}Fe_{0.8}Ge_{1.6}O_7$ | 0.6 | 0.8 | 8.153(1) | 5.348(1) |
| Example 8 | $Sr_2Co_{0.7}Fe_{0.6}Ge_{1.7}O_7$ | 0.7 | 0.6 | 8.157(0) | 5.342(0) |
| Example 9 | $Sr_2Co_{0.8}Fe_{0.4}Ge_{1.8}O_7$ | 0.8 | 0.4 | 8.158(0) | 5.338(0) |
| Example 10 | $Sr_2Co_{0.9}Fe_{0.2}Ge_{1.9}O_7$ | 0.9 | 0.2 | 8.165(1) | 5.333(1) |
| Reference Example 2 | $Sr_2CoGe_2O_7$ | 1.0 | 0 | 8.165(6) | 5.325(5) |

Table 3 shows lattice constants in an a-axis direction and a c-axis direction that are obtained by XRD patterns of melilite-type complex oxide samples obtained in Examples 11 to 20 and Reference Examples 3 and 4. The lattice constant in the a-axis direction continuously increased, and the lattice constant in the c-axis direction continuously decreased, as the amount of Co increased, except for Reference Example 3 and Example 11. Accordingly, it was found that a solid solution in which Fe and Co coexisted was continuously formed between $Ba_2Fe_2GeO_7$ (Reference Example 3) and $Ba_2CoGe_2O_7$ (Reference Example 4).

TABLE 3

|  | Chemical formula (theoretical ratio) | Amount x of Co | Amount 2 − 2x of Fe | Lattice constants in a-axis direction [Å] | Lattice constants in c-axis direction [Å] |
|---|---|---|---|---|---|
| Reference Example 3 | $Ba_2Fe_2GeO_7$ | 0 | 2.0 | 8.327(3) | 5.592(2) |
| Example 11 | $Ba_2Co_{0.1}Fe_{1.8}Ge_{1.1}O_7$ | 0.1 | 1.8 | 8.333(1) | 5.597(1) |
| Example 12 | $Ba_2Co_{0.2}Fe_{1.6}Ge_{1.2}O_7$ | 0.2 | 1.6 | 8.335(1) | 5.594(1) |
| Example 13 | $Ba_2Co_{0.3}Fe_{1.4}Ge_{1.3}O_7$ | 0.3 | 1.4 | 8.338(2) | 5.586(3) |
| Example 14 | $Ba_2Co_{0.4}Fe_{1.2}Ge_{1.4}O_7$ | 0.4 | 1.2 | 8.346(3) | 5.576(3) |
| Example 15 | $Ba_2Co_{0.5}FeGe_{1.5}O_7$ | 0.5 | 1.0 | 8.354(1) | 5.576(1) |
| Example 16 | $Ba_2Co_{0.6}Fe_{0.8}Ge_{1.6}O_7$ | 0.6 | 0.8 | 8.353(1) | 5.573(1) |
| Example 18 | $Ba2Co_{0.7}Fe_{0.6}Ge_{1.7}O_7$ | 0.7 | 0.6 | 8.359(1) | 5.569(1) |
| Example 19 | $Ba_2Co_{0.8}Fe_{0.4}Ge_{1.8}O_7$ | 0.8 | 0.4 | 8.366(0) | 5.563(0) |
| Example 20 | $Ba_2Co_{0.9}Fe_{0.2}Ge_{1.9}O_7$ | 0.9 | 0.2 | 8.372(1) | 5.558(1) |
| Reference Example 4 | $Ba_2CoGe_2O_7$ | 1.0 | 0 | 8.382(1) | 5.548(0) |

<Evaluation of Alkali Resistance>

0.15 g of the sample of Example 5 was immersed in 5 mL of a KOH aqueous solution that was adjusted to 4 M, and was left to stand at each of a room temperature (25° C.) and 40° C. or 60° C. for 24 hours. The color of the aqueous solution after being left to stand was visually checked. FIG. 3 is a picture of the aqueous solution before and after the sample of Example 5 is immersed in the KOH aqueous solution.

As it is found from FIG. 3A to FIG. 3D, there was no color in the aqueous solution immediately after the immersion (FIG. 3A), but the color became deeper as the temperature of the KOH aqueous solution increased (FIG. 3B to FIG. 3D). Therefore, it is considered that the metal ions are dissolved in the aqueous solution.

Figure 4:
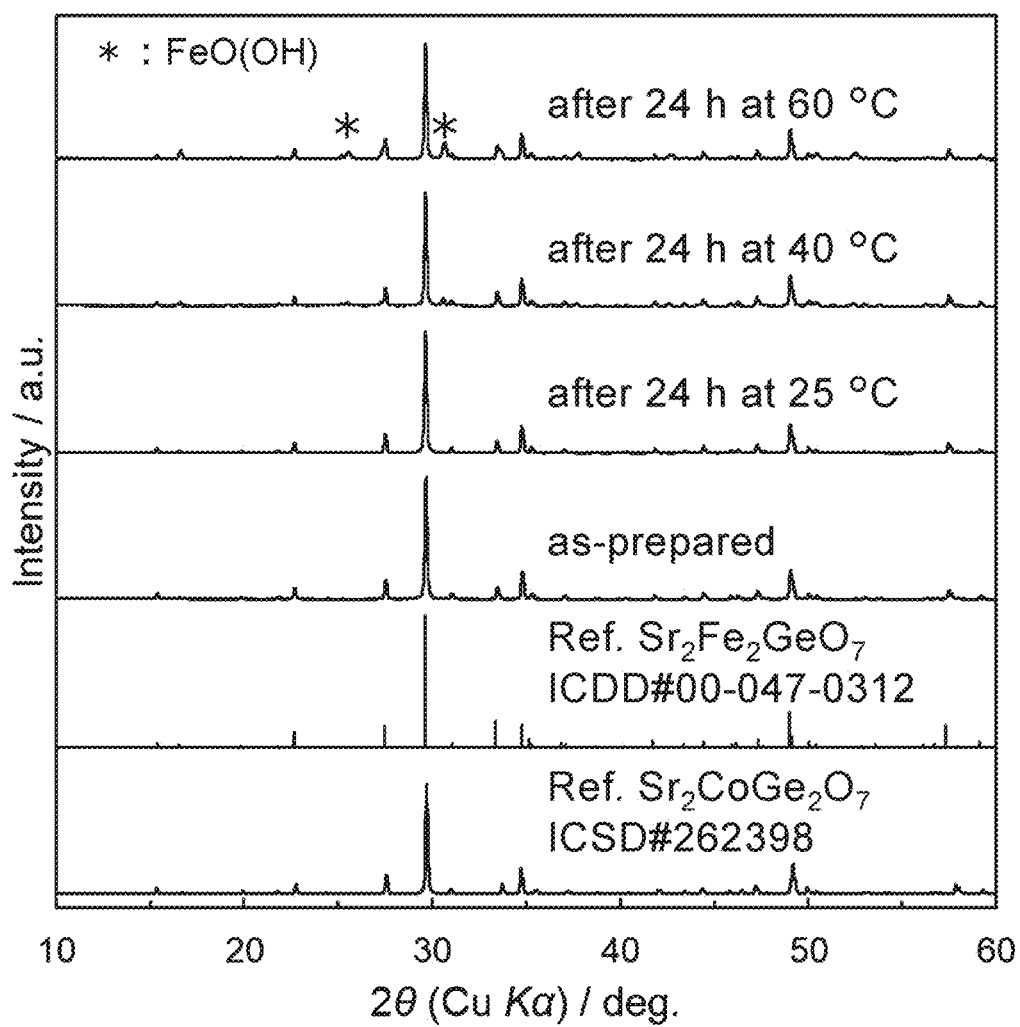
FIG. 4 shows XRD patterns of the sample of Example 5 before and after being immersed in the KOH aqueous solution.

Next, the sample after being immersed in the KOH aqueous solution and being left to stand was filtered, and was washed with ultrapure water until a washing liquid was neutralized. After that, the sample was dried, and the XRD pattern (a CuKα ray source) was measured. In addition, the XRD pattern of the sample before the immersion was also measured. FIG. 4 is the XRD pattern of the sample of Example 5 before and after being immersed in the KOH aqueous solution.

From the XRD patterns of FIG. 4, it was found that all of the samples that were immersed at 25° C., 40° C., and 60° C. had approximately the same peak intensity as that of a sample before the immersion, and a melilite-type crystalline structure was maintained even after the immersion. In addition, in the samples that were immersed at 25° C. and 40° C., the peak of the subphase was not generated, and even in the sample that was immersed at 60° C., the peak of iron oxide hydroxide (FeO(OH)) was slightly checked as the subphase. It is considered that a peak intensity of the main phase before and after the immersion does not greatly decrease, and a peak intensity of the subphase is extremely smaller than a peak intensity of the melilite composite oxide that is the main phase, and thus, the iron oxide hydroxide is generated only on the surface of the melilite-type complex oxide, and the crystalline structure was maintained. Therefore, such melilite-type complex oxides are compounds having extremely high chemical stability in which the crystalline structure can be maintained even in the case of being immersed in strong alkali at 60° C. for 24 hours, and is capable of standing the practical use as the positive-electrode catalyst of a metal-air battery.

<Evaluation of ORR Activity and OER Activity>

ORR activity and OER activity of the samples of Examples 1 to 28 and Reference Examples 1 to 5 were evaluated by a convection voltammetry (rotating disk electrode, RDE) method. A working electrode of a rotary electrode device (RRDE-3A, manufactured by BAS Inc.) was rotated at 1600 rpm, and was connected to a potentiostat (HZ-7000, manufactured by HOKUTO DENKO CORPORATION or VersaSTAT4, manufactured by METEK Meteorologische Messtechnik GmbH), and was subjected to cyclic voltammetry (CV) measurement by using a 4M-KOH aqueous solution as an electrolytic solution. The followings were used as the electrode.

Working Electrode (WE): 5 mmφ of Glassy Carbon (GC) Electrode

Counter Electrode (CE): Coiled Platinum (Pt) Electrode

Reference Electrode (RE): Alkaline Reference Electrode (Hg/HgO/4M KOH)

The sample was applied onto the working electrode in the form of an ink, and was evaluated. Hereinafter, the details will be described.

(Pretreatment of Carbon)

Acetylene Black (Acetylene Carbon Black, 99.99%, manufactured by Strem Chemicals, Inc.) was subjected to ultrasonic dispersion in a nitric acid for 30 minutes, and then, was at 80° C. overnight, was heated and stirred, and was filtered and dried, and then, was pulverized, as a pretreatment of carbon.

(Preparation of Solvent for Ink)

5% of Nafion (Registered Trademark) dispersion liquid (manufactured by Wako Pure Chemical Industries, Ltd.) was neutralized by a sodium hydroxide·ethanol (EtOH) solution, and a neutralizing liquid that was obtained was mixed with ethanol at a volume ratio of 3:47, and thus, a solvent for an ink was obtained.

(Preparation of Ink)

The solvent for an ink, the acetylene black, and a catalyst (an oxide sample) were put into a sample bottle, at a ratio of 5 mL:10 mg:50 mg, and were subjected to ultrasonic dispersion.

(Ink Application with Respect to Working Electrode)

The ink of 20 μL was dropped onto the glassy carbon that was washed with ultrapure water and EtOH (Amount of Catalyst: 0.2 mg), and was completely dried.

(Cyclic Voltammetry Measurement)

Cyclic voltammetry measurement was started after argon or oxygen gas flow was timely performed, in accordance with the following procedure. Measurement conditions are as follows.

(1) Cleaning Measurement (in Ar)
0.176 V to −0.324 V vs Hg/HgO, 50 mV/s,
30 Cycles
(2) Background (BG) Measurement (in Ar)
0.176 V to −0.324 V vs Hg/HgO, 1 mV/s,
3 Cycles
(3) $O_2$ Bubbling
(4) ORR Measurement (in $O_2$)
0.176 V to −0.324 V vs Hg/HgO, 1 mV/s,
3 Cycles
(5) OER Measurement
0.176 V to 0.776 V vs Hg/HgO, 1 mV/s,
3 Cycles From data obtained as described above, a relationship between a potential and a current density is illustrated, and catalyst activity was evaluated. Note that, the potential (a voltage value) was converted into a reversible hydrogen electrode (RHE) potential (U vs RHE=U vs Hg/HgO+0.924 V), and the current density was calculated from a current value that was obtained and an electrode area of the glassy carbon.

Figure 5B:
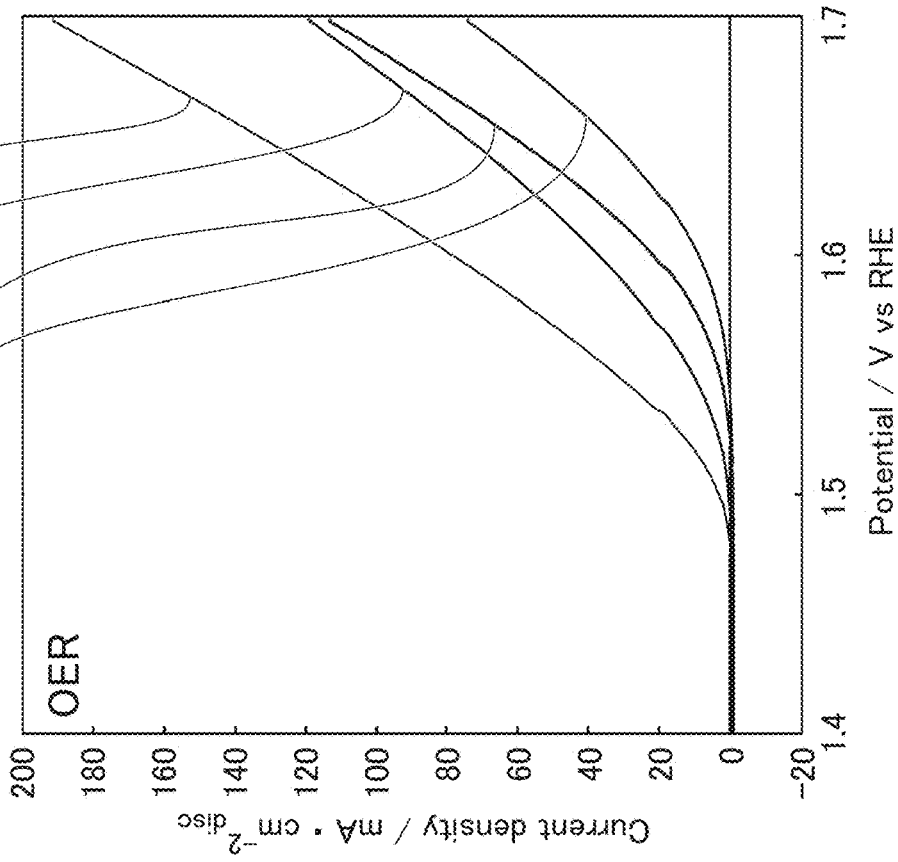
FIG. 5B shows a current density-potential curve for OER of the samples of Example 7, Reference Example 2, and Comparative Examples 1 and 2.
Figure 5A:
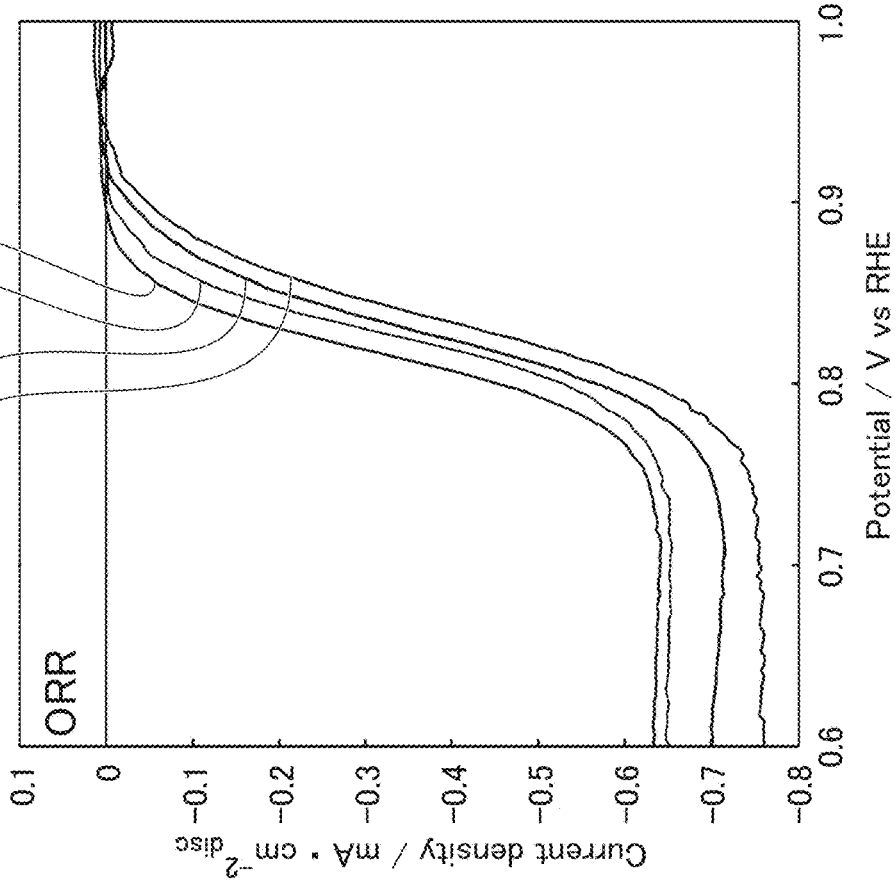
FIG. 5A shows current density-potential curves for ORR of samples of Example 7, Reference Example 2, and Comparative Examples 1 and 2.

FIG. 5A is the current density-potential curves in an ORR reaction of the samples of Example 7, Reference Example 2, and Comparative Examples 1 and 2. The samples of Example 7 and Reference Example 2 have approximately the same level of ORR activity as that of the samples of Comparative Example 1 and Comparative Example 2 that are a perovskite compound used as the positive-electrode catalyst of the related art.

FIG. 5B is the current density-potential curves in an OER reaction of the samples of Example 7, Reference Example 2, and Comparative Examples 1 and 2. The sample of Example 7 had extremely high OER activity, compared to the samples of Comparative Example 1 and Comparative Example 2 that were the perovskite compound. In addition, the sample of Reference Example 2 also has approximately the same level of the OER activity as that of the samples of Comparative Example 1 and Comparative Example 2 that are the perovskite-type compound used as the positive-electrode catalyst of the related art.

FIG. 6A is the current density-potential curves in an ORR reaction of the samples of Examples 5, 7, 9, and 10 and Reference Examples 1 and 2. All of the samples have high ORR activity, and among them, the samples of Examples 9 and 10 have particularly high ORR activity.

FIG. 6B is the current density-potential curves in an OER reaction of the samples of Examples 5, 7, 9, and 10 and Reference Examples 1 and 2. All of the samples have high OER activity, and among them, the samples of Examples 7 and 9 have particularly high OER activity.

Figure 7A:
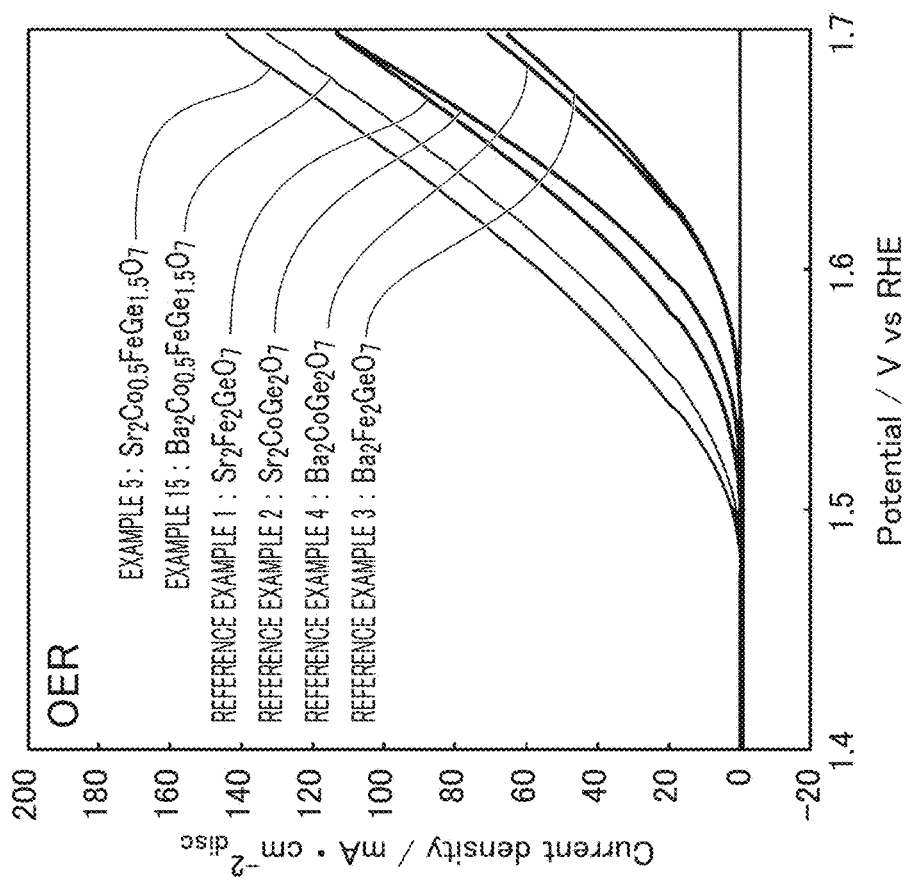
FIG. 7A shows current density-potential curves for ORR of samples of Examples 6 and 18 and Reference Examples 1 to 4.

FIG. 7A is the current density-potential curves in an ORR reaction of the samples of Examples 6 and 18 and Reference Examples 1 to 4. All of the samples have high ORR activity, and among them, the samples of Reference Example 4 and Reference Example 2 have particularly high ORR activity. The ORR activity increases in the order of Reference Example 4, Reference Example 2, Example 15, Example 5, Reference Example 3, and Reference Example 1, and thus, there is a tendency that the ORR activity increases as the content of Co increases. On the other hand, in the case of comparing Reference Example 1 with Reference Example 3, Example 5 with Example 15, and Reference Example 2 with Reference Example 4, respectively, in Reference Example 3, Example 15, and Reference Example 4, the ORR activity is slightly high, and thus, there is a tendency that the ORR activity increases as the content of Ba increases.

Figure 7B:
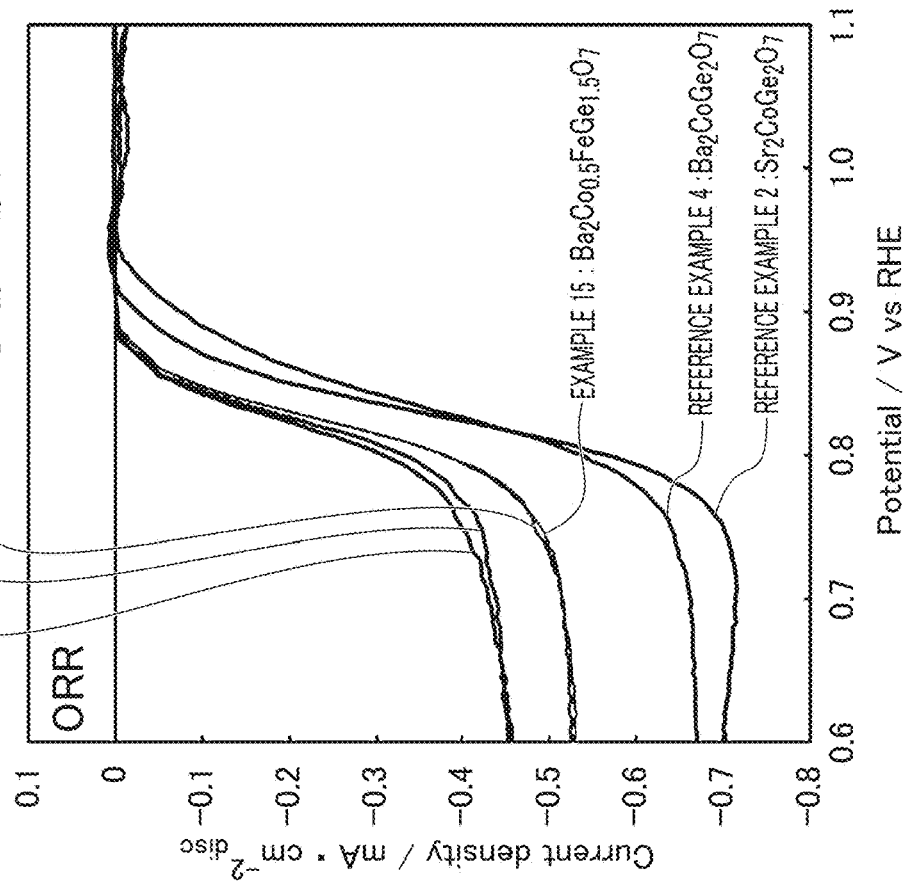
FIG. 7B shows current density-potential curves for OER of the samples of Examples 6 and 18 and Reference Examples 1 to 4.

FIG. 7B is the current density-potential curves in an OER reaction of the samples of Examples 6 and 18 and Reference Examples 1 to 4. All of the samples have high OER activity, and among them, the samples of Examples 5 and 15 have particularly high OER activity. The OER activity increases in the order of Example 5, Example 15, Reference Example 1, Reference Example 2, Reference Example 4, and Reference Example 3, and thus, Co and Fe coexist, and there is a tendency that the OER activity increases. On the other hand, in the case of comparing Reference Example 1 with Reference Example 3, Example 5 with Example 15, and Reference Example 2 with Reference Example 4, respectively, in Reference Example 1, Example 5, and Reference Example 2, the OER activity is high, and thus, the OER activity increases as the content of Sr increases.

Figure 8B:
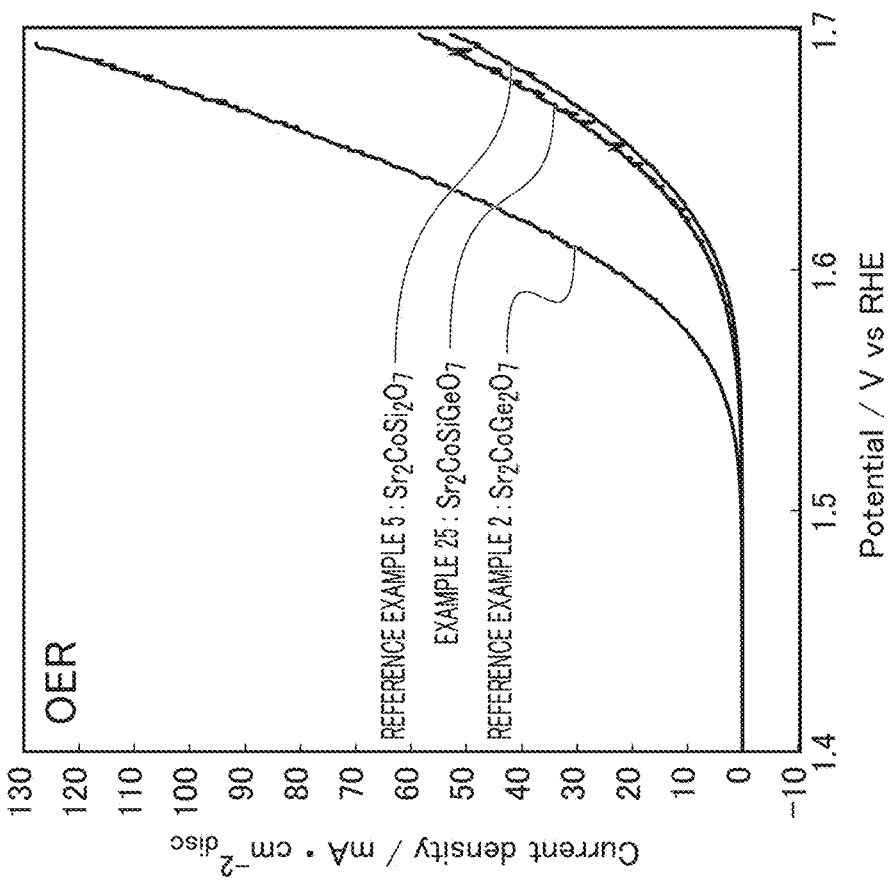
FIG. 8B shows current density-potential curves in an OER reaction of the samples of Example 25 and Reference Examples 2 and 5.
Figure 8A:
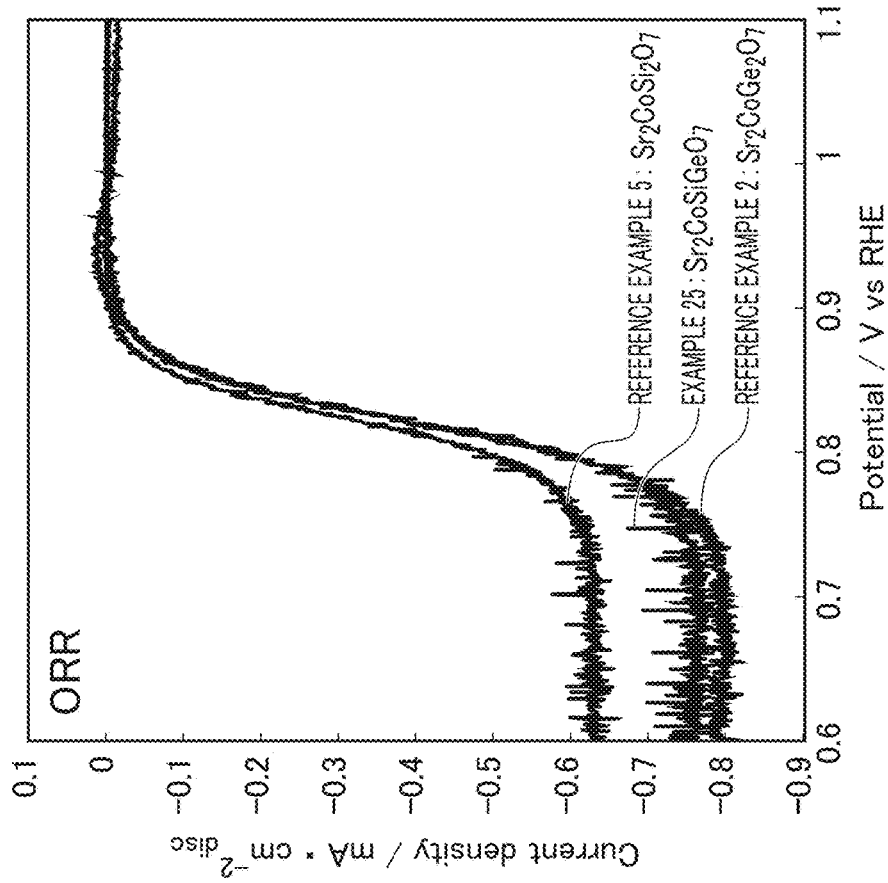
FIG. 8A shows current density-potential curves for ORR of samples of Example 25 and Reference Examples 2 and 5.

FIG. 8A is the current density-potential curves in an ORR reaction of the samples of Example 25, Reference Examples 2 and 5. All of the samples have high ORR activity. The ORR activity increases in the order of Reference Example 2, Example 25, and Reference Example 5, and thus, the ORR activity increases as the content of Ge increases.

FIG. 8B is the current density-potential curves in an OER reaction of the samples of Example 25 and Reference Examples 2 and 5. All of the samples have high OER activity. The OER activity increases in the order of Example 25, Reference Example 5, and Reference Example 2, and thus, the OER activity increases as the content of Ge increases.

Table 4 shows Tafel slopes of OER of the samples of Examples 1 to 33. In any of the samples, it was found that the Tafel slope was smaller than a Tafel slope of Co-based perovskite (approximately 60 mV·dec$^{-1}$).

TABLE 4

| | Chemical formula (theoretical ratio) | Tafel slope [mV · dec$^{-1}$] |
|---|---|---|
| Reference Example 1 | $Sr_2Fe_2GeO_7$ | 43.1 |
| Example 2 | $Sr_2Co_{0.2}Fe_{1.6}Ge_{1.2}O_7$ | 44.8 |
| Example 5 | $Sr_2Co_{0.5}FeGe_{1.5}O_7$ | 41.3 |
| Example 6 | $Sr_2Co_{0.6}Fe_{0.8}Ge_{1.6}O_7$ | 41.9 |
| Example 7 | $Sr_2CO_{0.67}Fe_{0.66}Ge_{1.67}O_7$ | 38.9 |
| Example 8 | $Sr_2Co_{0.7}Fe_{0.6}Ge_{1.7}O_7$ | 41.9 |
| Example 9 | $Sr_2Co_{0.8}Fe_{0.4}Ge_{1.8}O_7$ | 45.1 |
| Example 10 | $Sr_2Co_{0.9}Fe_{0.2}Ge_{1.9}O_7$ | 48.0 |
| Reference Example 2 | $Sr_2CoGe_2O_7$ | 47.2 |
| Example 15 | $Ba_2Co_{0.5}FeGe_{1.5}O_7$ | 41.3 |
| Reference Example 4 | $Ba_2CoGe_2O_7$ | 51.6 |
| Example 24 | $Sr_2Co_{0.67}Fe_{0.66}Si_{1.67}O_7$ | 49.7 |
| Example 25 | $Sr_2CoSiGeO_7$ | 59.8 |
| Reference Example 5 | $Sr_2CoSi_2O_7$ | 53.0 |
| Example 28 | $Ba_2CoSiGeO_7$ | 55.0 |

<Crystalline Structure Analysis of Powder Neutron Diffraction Method>

In the melilite-type complex oxides of Reference Example 1, Example 7, and Example 9, in order to check which of the 2a site and the 4e site the transition metal elements were respectively arranged, a diffraction pattern was obtained by a powder neutron diffraction method, and then, the diffraction pattern was subjected to Rietveld analysis to refine structure parameters, and detailed analysis of the crystalline structure was performed. The measurement was performed by using a time-of-flight method powder neutron diffractometer SPICA (BL09) of Materials and Life Science Experimental Facility (MLF) of Japan Proton Accelerator Research Complex (J-PARC) (refer to M. Yonemura, K. Mori, T. Kamiyama et al., Development of SPICA, New Dedicated Neutron Powder Diffractometer for Battery Studies, J. Phys. Conf. Ser. 502, 012053, (2014)). In addition, Z-Rietveld was used as an analysis program (refer to R. Oishi, M. Yonemura, Y. Nishimaki et al., Rietveld analysis software for J-PARC, Nucl. Instrum. Methods Phys. Res., Sect. A 600, 94, (2009)).

Figure 9:
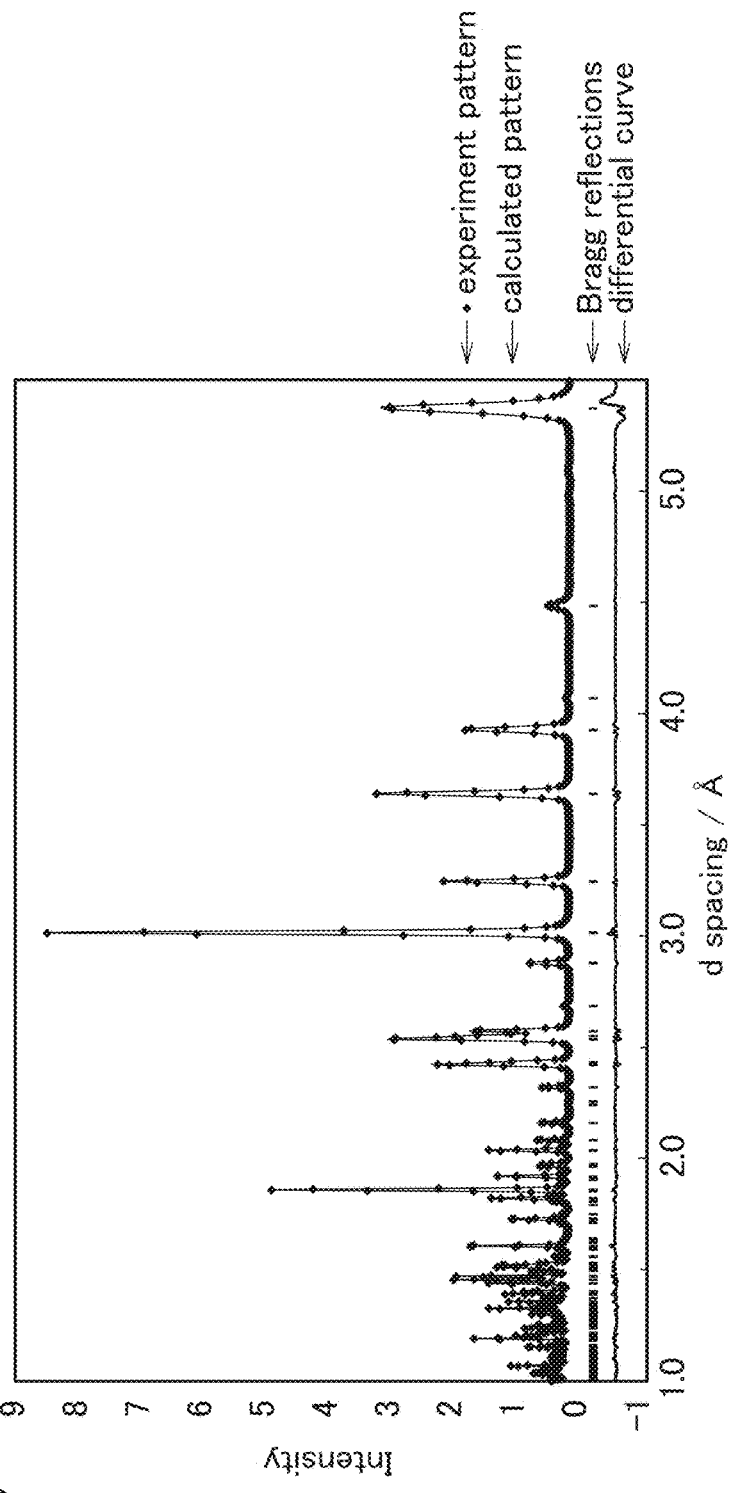
FIG. 9 shows a neutron diffraction pattern of the sample of Reference Example 1 and a result of Rietveld analysis.
Figure 10:
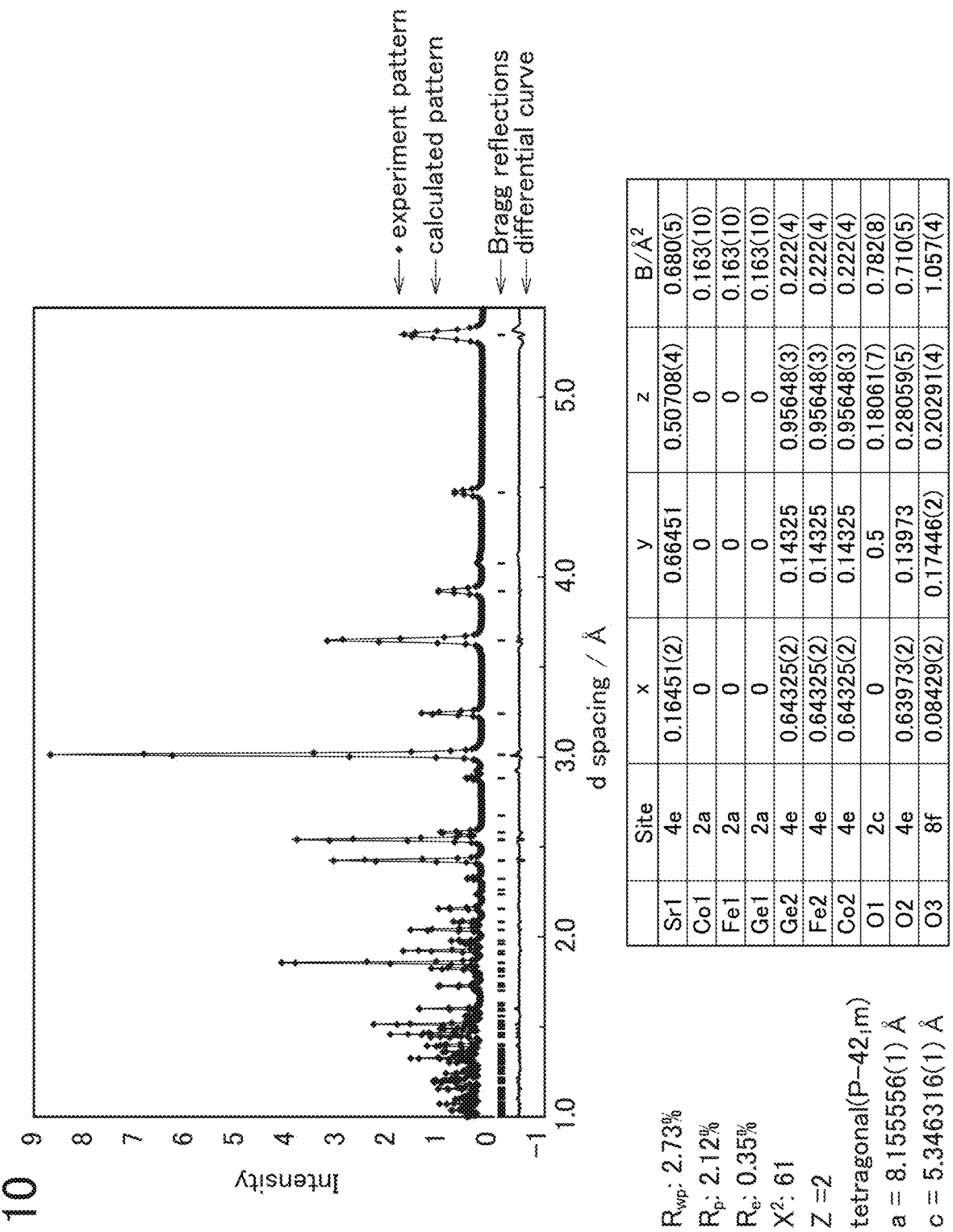
FIG. 10 shows a neutron diffraction pattern of the sample of Example 7 and a result of Rietveld analysis.
Figure 11:
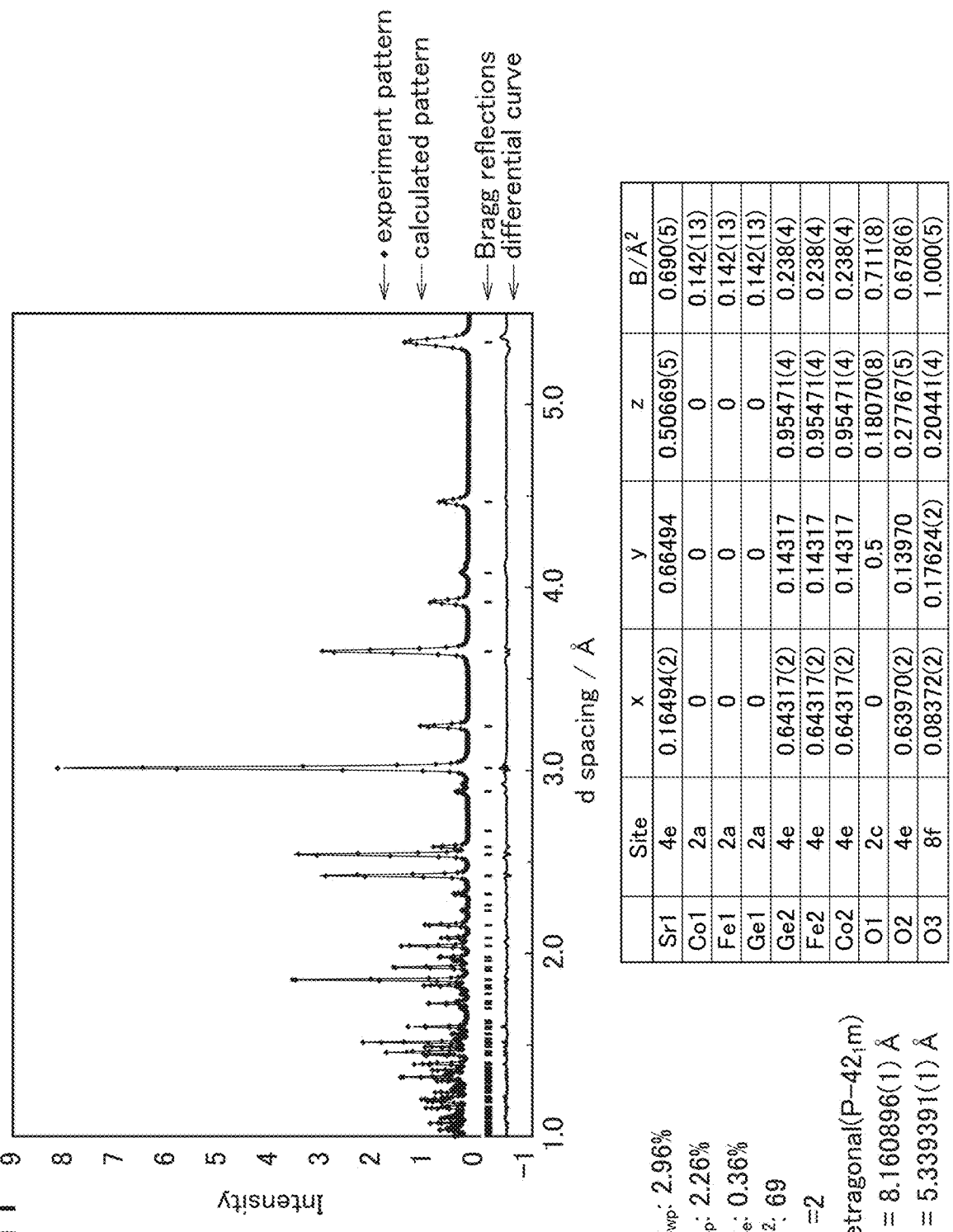
FIG. 11 shows a neutron diffraction pattern of the sample of Example 9 and a result of Rietveld analysis.

FIG. 9 to FIG. 11 are neutron diffraction patterns of the samples of each of Reference Example 1, Example 7, and Example 9 and the results of the Rietveld analysis (an occupancy and an average coupling length of each of the metal elements in the 2a site and the 4e site of the melilite-type crystalline structure).

From such results, in the 2a site and the 4e site of the samples of each of Reference Example 1, Example 7, and Example 9, an occupancy of each of the configuration transition metal elements was calculated. Table 1 shows the occupancy of each of the configuration transition metal elements in the samples of each of Reference Example 1, Example 7, and Example 9.

TABLE 5

| | Chemical formula (theoretical ratio) | 2a SITE | | | 4e SITE | | | 2a SITE average coupling length [Å] | 4e SITE average coupling length [Å] |
|---|---|---|---|---|---|---|---|---|---|
| | | Co [%] | Fe [%] | Ge [%] | Co [%] | Fe [%] | Ge [%] | | |
| Reference Example 1 | $Sr_2Fe_2GeO_7$ | — | 86.8 | 13.2 | — | 56.6 | 43.4 | 1.8602 | 1.8111 |
| Example 7 | $Sr_2Co_{0.67}Fe_{0.66}Ge_{1.67}O_7$ | 60.9 | 34.6 | 4.5 | 3.0 | 16.2 | 80.8 | 1.9167 | 1.7751 |
| Example 9 | $Sr_2Co_{0.8}Fe_{0.4}Ge_{1.8}O_7$ | 73.4 | 16.8 | 9.8 | 3.3 | 11.6 | 85.1 | 1.9305 | 1.7666 |

Figure 12:
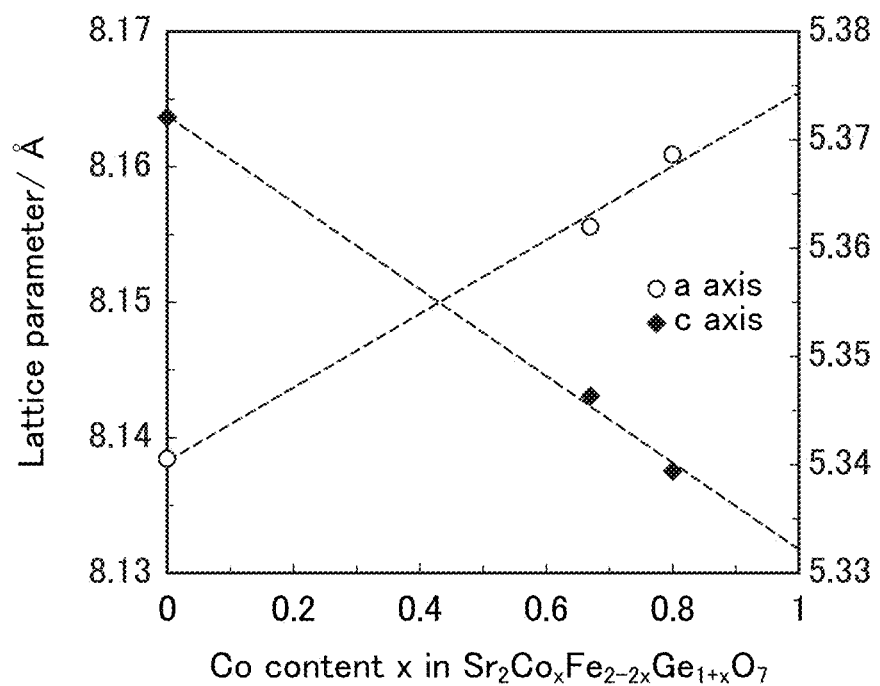
FIG. 12 is a graph of a lattice constant vs a content ratio of Co for an a- and a c-axis direction of the samples of Reference Example 1, Example 7, and Example 9.

FIG. 12 is a graph of the lattice constants vs a content ratio of Co (x in general formula $Sr_2CO_xFe_{2-2x}Ge_{1+x}O_7$) in an a-axis direction and a c-axis direction of the samples of Reference Example 1, Example 7, and Example 9. From FIG. 12, it was found that the lattice constants were linearly changed with respect to x.

Here, in a four-coordination ionic radius of each of the transition metal elements, $Co^{2+}$(HS) was 0.72 Å, $Fe^{3+}$ was 0.63 Å, and $Ge^{4+}$ was 0.53 Å (refer to R. D. Shannon, Acta Cryst. A32, 751 (1976)), and it was found that the lattice constant in the c-axis direction increased, and the lattice constant in the a-axis direction decreased, as more ions having a large ion radius were arranged in the 4e site.

As described above, the fact that the lattice constants being linearly changed as the amount of metal is changed, and the lattice constants increases as the ion having a large ion radius increases is found in a solid solution containing a plurality of metal elements, and it can be said that the solid solution is formed even in the samples obtained as described above.

Note that, it is considered that the reason that the lattice constant in the c-axis direction increases, and the lattice constant in the a-axis direction decreases, as more ions having a large ion radius are arranged in the 4e site, is as follows. In the 4e site, a bottom surface is directed to be perpendicular to the c-axis direction (horizontal to the ab plane), but in the 2a site, the bottom surface is arranged to be inclined. That is, the 4e site has a greater influence on the length in the c-axis direction. On the other hand, it is considered that in the 2a site, the 2a site and the 4e site are connected on a diagonal line of the ab axis, and thus, both of the sites contribute to the length in the a-axis direction, but the 2a site decreases due to an increase in the 4e site, and the influence of the 2a site further increases.

EXPLANATION OF REFERENCE NUMERALS

1 POSITIVE-ELECTRODE
2 NEGATIVE-ELECTRODE
3 ELECTROLYTE
10 METAL-AIR ELECTRODE

The invention claimed is:

1. A melilite-type complex oxide represented by a general formula $(Ba_zSr_{1-z})_2Co_xFe_{2-2x}(Si_yGe_{1-y})_{1+x}O_7$ (in the formula, $0 \leq x \leq 1$, $0 \leq y \leq 1$, and $0 \leq z \leq 1$, excluding the case of x=1, y=1, and z=0, the case of x=1, y=1, and z=1, the case of x=1, y=0, and z=0, the case of x=1, y=0, and z=1, the case of x=0, y=0, and z=0, and the case of x=0, y=0, and z=1.

2. The melilite-type complex oxide according to claim 1, wherein $0.5 \leq x \leq 0.9$ is satisfied in the general formula.

3. The melilite-type complex oxide according to claim 1, wherein $0 \leq y \leq 0.1$ is satisfied in the general formula.

4. A melilite-type complex oxide represented by a general formula $(Ba_{z1}Sr_{1-z1-z2}RE_{z2})_2Co_{x1}Zn_{x2}Fe_{2-2(x1+x2)}(Si_yGe_{1-y})_{1+x1+x2}O_7$ (in the formula, $0 \leq x1 \leq 1$, $0 \leq x2 \leq 0.2$, $0 \leq y \leq 1$, $0 \leq z1 \leq 1$, $0 \leq z2 \leq 0.2$, and at least one of x2 and z2 is greater than 0).

5. The melilite-type complex oxide according to claim 4, wherein in the melilite-type complex oxide, RE is Y in the general formula.

* * * * *